US012671310B2

(12) United States Patent
Yang et al.

(10) Patent No.: US 12,671,310 B2
(45) Date of Patent: Jun. 30, 2026

(54) POWER CONVERSION APPARATUS AND CHARGING APPARATUS

(71) Applicant: Huawei Digital Power Technologies Co., Ltd., Shenzhen (CN)

(72) Inventors: Jin Yang, Shenzhen (CN); Zejie Lv, Dongguan (CN); Kun Yu, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 190 days.

(21) Appl. No.: 18/760,567

(22) Filed: Jul. 1, 2024

(65) Prior Publication Data

US 2025/0015699 A1 Jan. 9, 2025

(30) Foreign Application Priority Data

Jul. 3, 2023 (CN) .......................... 202310810698.2

(51) Int. Cl.
H02M 1/00 (2007.01)
H02J 1/102 (2026.01)
H02J 3/46 (2026.01)

(52) U.S. Cl.
CPC .......... H02M 1/0041 (2021.05); H02J 1/102 (2013.01); H02J 3/46 (2013.01); H02M 1/0009 (2021.05)

(58) Field of Classification Search
CPC .... H02M 1/0009; H02M 1/0043; H02J 1/102;

H02J 3/46; H02J 2105/37; H02J 7/44;
H02J 7/02; H02J 7/50; B60L 2210/10;
B60L 2210/30; B60L 53/20; B60L 53/22
See application file for complete search history.

(56) References Cited

U.S. PATENT DOCUMENTS

| | | | |
|---|---|---|---|
| 11,641,167 B1 | 5/2023 | Ulrich et al. | |
| 11,677,330 B2 * | 6/2023 | Inomata ................ | H02M 5/458 |
| | | | 363/15 |
| 2007/0279948 A1 * | 12/2007 | Shin ........................ | H02P 21/00 |
| | | | 363/41 |
| 2013/0020989 A1 | 1/2013 | Xia et al. | |
| 2015/0145462 A1 * | 5/2015 | Ulrich ................... | H02M 5/458 |
| | | | 363/37 |
| 2024/0372457 A1 * | 11/2024 | Cai ..................... | H02M 1/0043 |

FOREIGN PATENT DOCUMENTS

| | | |
|---|---|---|
| CN | 105048829 B | 6/2018 |
| CN | 115037182 A | 9/2022 |
| JP | 5734356 B2 | 6/2015 |
| WO | 2020216016 A1 | 10/2020 |

* cited by examiner

*Primary Examiner* — Sisay G Tiku

(74) *Attorney, Agent, or Firm* — Maier & Maier, PLLC

(57) ABSTRACT

A power conversion apparatus includes an AC-DC conversion circuit, a power controller, and a circulating current controller. The power controller is configured to control the AC-DC conversion circuit to convert a received alternating current into a first direct current and output the first direct current. The circulating current controller is configured to send a synchronization signal to another power conversion apparatus through a controller area network (CAN) bus. The synchronization signal is used to synchronize a carrier of the another power conversion apparatus with a carrier of the power conversion apparatus.

17 Claims, 10 Drawing Sheets

POWER CONVERSION APPARATUS AND CHARGING APPARATUS

CROSS-REFERENCE TO RELATED APPLICATION

This application claims priority to Chinese Patent Application No. 202310810698.2, filed on Jul. 3, 2023, which is hereby incorporated by reference in its entirety.

TECHNICAL FIELD

The embodiments relate to the energy field, a power conversion apparatus, and a charging apparatus.

BACKGROUND

With rapid development of new energy vehicles, vehicle charging devices are increasingly used as supporting facilities. A vehicle charging device may include an alternating current-direct current (AC-DC) conversion apparatus and a direct current-direct current (DC-DC) conversion apparatus. The AC-DC conversion apparatus is configured to convert an alternating current output by a power grid into a direct current, and the DC-DC conversion apparatus is configured to convert the direct current output by the AC-DC conversion apparatus into direct current charging electric energy, to charge a new energy vehicle.

During actual use, because a requirement for a charging rate of the new energy vehicle is gradually increased, a plurality of AC-DC conversion apparatuses connected in parallel may be disposed in the vehicle charging device. Each AC-DC conversion apparatus converts power of the alternating current output by the power grid, to improve an alternating current-direct current power conversion capability of the vehicle charging device. In this way, high-power charging of the new energy vehicle by the vehicle charging device is implemented.

However, most AC-DC conversion apparatuses in the vehicle charging device are non-isolated, and a circulating current is easily generated between the plurality of AC-DC conversion apparatuses connected in parallel. The circulating current causes an increase in a loss of the AC-DC power conversion apparatus and a decrease in power conversion efficiency. Consequently, running stability of the vehicle charging device is affected.

SUMMARY

The embodiments provide a power conversion apparatus and a charging apparatus, to suppress a circulating current between a plurality of power conversion apparatuses connected in parallel, to improve running stability of the charging apparatus.

According to a first aspect, a power conversion apparatus is provided. The power conversion apparatus includes an alternating current-direct current (AC-DC) conversion circuit; a power controller, where the power controller is connected to the AC-DC conversion circuit, and the power controller is configured to control the AC-DC conversion circuit to receive an alternating current, convert the alternating current into a first direct current, and output the first direct current; and a circulating current controller, where the circulating current controller is configured to send a synchronization signal to another power conversion apparatus through a controller area network (CAN) bus, where the synchronization signal is used to synchronize a carrier of the another power conversion apparatus with a carrier of the power conversion apparatus.

When the power conversion apparatus provided in this embodiment is connected to the another power conversion apparatus in parallel, the power conversion apparatus may be used as a primary power conversion apparatus, and the another power conversion apparatus may be used as a secondary power conversion apparatus. An independent circulating current controller is disposed in the primary power conversion apparatus, and the circulating current controller sends the synchronization signal to each secondary power conversion apparatus through the CAN bus, so that the carrier of the primary power conversion apparatus is synchronized with the carrier of the secondary power conversion apparatus. In this way, a high-frequency circulating current component in a circulating current between the power conversion apparatuses connected in parallel can be suppressed. This helps reduce a loss of each power conversion apparatus, ensure power conversion efficiency of each power conversion apparatus, and improve running stability of the power conversion apparatuses connected in parallel. In addition, no additional hardware device needs to be added. Therefore, costs are low, and production is facilitated.

In addition, the power conversion apparatus provided in this embodiment communicates and interacts with the another power conversion apparatus through the CAN bus, to transmit the synchronization signal. Therefore, a network topology structure is simple, communication efficiency is high, and low-cost production is better facilitated.

With reference to the first aspect, in some implementations of the first aspect, the circulating current controller includes a first primary timer. The first primary timer is configured to adjust, based on edge triggering of the synchronization signal, a period of the carrier of the power conversion apparatus to be synchronized with a target carrier period. The target carrier period is synchronized with a period of the carrier of the another power conversion apparatus.

The target carrier period may be preset on the circulating current controller.

It may be understood that the edge triggering of the synchronization signal may be triggering at a rising edge of the synchronization signal or may be triggering at a falling edge of the synchronization signal. This is not limited.

In the power conversion apparatus provided in this embodiment, the primary timer in the circulating current controller may adjust, through triggering of the synchronization signal, the period of the carrier of the power conversion apparatus to be synchronized with the target carrier period. Because the target carrier period is simultaneously synchronized with the period of the carrier of the another power conversion apparatus, the period of the carrier of the power conversion apparatus provided in this embodiment is synchronized with the period of the carrier of the another power conversion apparatus. In this way, when the power conversion apparatus provided in this embodiment is connected to the another power conversion apparatus in parallel, the carrier of the power conversion apparatus can be synchronized with the carrier of the another power conversion apparatus.

With reference to the first aspect, in some implementations of the first aspect, the circulating current controller further includes a first secondary timer. The first secondary timer is connected to the first primary timer. The first primary timer is further configured to: when a count value of the first primary timer is a period value of the target carrier period, send a first trigger signal to the first secondary timer. The first trigger signal indicates to reset a count value of the first secondary timer.

It may be understood that there may be a plurality of first secondary timers, for example, five or six. This is not limited.

The first primary timer in the circulating current controller is periodically synchronized with the first secondary timer by using the first trigger signal, so that the first primary timer and the first secondary timer output signals with a same frequency and a same phase. In this way, signals in the power conversion apparatus are synchronized.

With reference to the first aspect, in some implementations of the first aspect, the circulating current controller further includes a synchronization timer. The synchronization timer is connected to the first primary timer and the secondary power conversion apparatus. The synchronization timer is configured to: when a count value of the synchronization timer is a first period value, send the synchronization signal to the first primary timer and the secondary power conversion apparatus.

It may be understood that the first period value may be a period value of the synchronization signal. In an example, the first period value may be greater than the period value of the target carrier period.

The power conversion apparatus provided in this embodiment may periodically send the synchronization signal to the first primary timer and the another power conversion apparatus by using the synchronization timer in the circulating current controller, and adjust, through triggering of the synchronization signal, the period of the carrier of the power conversion apparatus to be synchronized with the target carrier period, so that the period of the carrier of the power conversion apparatus is synchronized with the period of the carrier of the another power conversion apparatus.

With reference to the first aspect, in some implementations of the first aspect, the power conversion apparatus further includes a circulating current detection circuit, and the AC-DC conversion circuit includes a plurality of switches. The circulating current detection circuit is connected to an input end of the AC-DC conversion circuit and the circulating current controller. The circulating current detection circuit is configured to: detect a circulating current value at the input end of the AC-DC conversion circuit and transmit the circulating current value to the circulating current controller. The circulating current controller is configured to: receive a first modulated wave from the power controller and adjust the first modulated wave based on the circulating current value, to obtain a second modulated wave. The second modulated wave is used to determine a drive signal. The drive signal is used to control turn-on time of the plurality of switches.

It may be understood that during implementation, the circulating current controller may send the second modulated wave to the power controller, and the power controller determines the drive signal based on the second modulated wave.

The circulating current detection circuit is disposed in the power conversion apparatus, so that the circulating current value input to the AC-DC conversion circuit can be detected in real time. The circulating current controller may perform, based on the circulating current value, compensation adjustment on a modulated wave output by the power controller, and send the modulated wave obtained through adjustment to the power controller. Further, the power controller controls the turn-on time of the plurality of switches in the AC-DC conversion circuit by using the drive signal generated based on the adjusted modulated wave, so that a low-frequency circulating current component in a circulating current in the AC-DC conversion circuit can reach a preset circulating current threshold. The preset circulating current threshold may be, for example, 0. In this way, when a plurality of power conversion apparatuses provided in this embodiment are connected in parallel, a low-frequency circulating current component in a circulating current between the power conversion apparatuses can be suppressed. This helps reduce a loss of each power conversion apparatus, ensure power conversion efficiency of each power conversion apparatus, and improve running stability of the power conversion apparatuses connected in parallel.

With reference to the first aspect, in some implementations of the first aspect, the circulating current controller is further configured to: determine a circulating current deviation based on the circulating current value and a preset circulating current threshold, perform operation adjustment on the circulating current deviation, to obtain a first compensation amount, and perform superposition processing on the first compensation amount and the first modulated wave, to obtain the second modulated wave.

The circulating current controller may determine, by using the preset circulating current threshold as a target, a deviation between the circulating current value and the preset circulating current threshold, to determine, based on the deviation, a compensation amount for performing compensation adjustment on the first modulated wave output by the power controller. This helps ensure that the power controller can control the turn-on time of the plurality of switches in the AC-DC conversion circuit by using the drive signal determined based on the adjusted second modulated wave, so that the low-frequency circulating current component in the circulating current in the AC-DC conversion circuit reaches the preset circulating current threshold. In this way, the low-frequency circulating current component in the circulating current is suppressed.

In some embodiments, the operation adjustment includes any one of a proportion operation, a proportion integral operation, and a proportion integral derivative operation.

With reference to the first aspect, in some implementations of the first aspect, the circulating current controller is further configured to send the second modulated wave to the power controller. The power controller is further configured to determine the drive signal based on the second modulated wave and the carrier of the power conversion apparatus.

The power controller may compare the second modulated wave obtained through compensation adjustment with the carrier of the power conversion apparatus, and adjust a duty cycle of the drive signal, so that the power controller can control the turn-on time of the plurality of switches in the AC-DC conversion circuit by using the drive signal. In this way, the low-frequency circulating current component in the AC-DC conversion circuit reaches the preset circulating current threshold.

According to a second aspect, a power conversion apparatus is provided. The power conversion apparatus includes an alternating current-direct current (AC-DC) conversion circuit; a power controller, where the power controller is connected to the AC-DC conversion circuit, and the power controller is configured to control the AC-DC conversion circuit to receive an alternating current, convert the alternating current into a first direct current, and output the first direct current; and a circulating current controller, where the circulating current controller is configured to receive a synchronization signal from another power conversion apparatus through a controller area network (CAN) bus, where the synchronization signal is used to synchronize a carrier of the power conversion apparatus with a carrier of the another power conversion apparatus.

When the power conversion apparatus provided in this embodiment is connected to the another power conversion apparatus in parallel, the power conversion apparatus may be used as a secondary power conversion apparatus, and the another power conversion apparatus may be used as a primary power conversion apparatus. An independent circulating current controller is disposed in the secondary power conversion apparatus, and the circulating current controller receives the synchronization signal from the primary power conversion apparatus through the CAN bus, so that the carrier of the secondary power conversion apparatus is synchronized with the carrier of the primary power conversion apparatus. In this way, a high-frequency circulating current component in a circulating current between the power conversion apparatuses connected in parallel can be suppressed. This helps reduce a loss of each power conversion apparatus, ensure power conversion efficiency of each power conversion apparatus, and improve running stability of the power conversion apparatuses connected in parallel. In addition, no additional hardware device needs to be added. Therefore, costs are low, and production is facilitated.

In addition, the power conversion apparatus provided in this embodiment communicates and interacts with the another power conversion apparatus through the CAN bus, to transmit the synchronization signal. Therefore, a network topology structure is simple, communication efficiency is high, and low-cost production is better facilitated.

With reference to the second aspect, in some implementations of the second aspect, the circulating current controller includes a second primary timer. The second primary timer is configured to adjust, based on edge triggering of the synchronization signal, a period of the carrier of the power conversion apparatus to be synchronized with a target carrier period. The target carrier period is synchronized with a period of the carrier of the another power conversion apparatus.

In the power conversion apparatus provided in this embodiment, the primary timer in the circulating current controller may adjust, through triggering of the synchronization signal, the period of the carrier of the power conversion apparatus to be synchronized with the target carrier period. Because the target carrier period is simultaneously synchronized with the period of the carrier of the another power conversion apparatus, the period of the carrier of the power conversion apparatus provided in this embodiment is synchronized with the period of the carrier of the another power conversion apparatus. In this way, when the power conversion apparatus provided in this embodiment is connected to the another power conversion apparatus in parallel, the carrier of the power conversion apparatus provided in this embodiment can be synchronized with the carrier of the another power conversion apparatus.

With reference to the second aspect, in some implementations of the second aspect, the circulating current controller further includes a second secondary timer. The second secondary timer is connected to the second primary timer. The second primary timer is further configured to: when a count value of the second primary timer is a period value of the target carrier period, send a second trigger signal to the second secondary timer. The second trigger signal indicates to reset a count value of the second secondary timer, so that the second primary timer is synchronized with the second secondary timer.

The second primary timer in the circulating current controller is periodically synchronized with the second secondary timer by using the second trigger signal, so that the second primary timer and the second secondary timer output signals with a same frequency and a same phase. In this way, signals in the power conversion apparatus are synchronized.

With reference to the second aspect, in some implementations of the second aspect, the power conversion apparatus further includes a circulating current detection circuit, and the AC-DC conversion circuit includes a plurality of switches. The circulating current detection circuit is connected to an input end of the AC-DC conversion circuit and the circulating current controller. The circulating current detection circuit is configured to: detect a circulating current value at the input end of the AC-DC conversion circuit and transmit the circulating current value to the circulating current controller. The circulating current controller is configured to: receive a first modulated wave from the power controller and adjust the first modulated wave based on the circulating current value, to obtain a second modulated wave. The second modulated wave is used to determine a drive signal. The drive signal is used to control turn-on time of the plurality of switches.

With reference to the second aspect, in some implementations of the second aspect, the circulating current controller is further configured to: determine a circulating current deviation based on the circulating current value and a preset circulating current threshold, perform operation adjustment on the circulating current deviation, to obtain a first compensation amount, and perform superposition processing on the first compensation amount and the first modulated wave, to obtain the second modulated wave.

In some embodiments, the operation adjustment includes any one of a proportion operation, a proportion integral operation, and a proportion integral derivative operation.

With reference to the second aspect, in some implementations of the second aspect, the circulating current controller is further configured to send the second modulated wave to the power controller. The power controller is further configured to determine the drive signal based on the second modulated wave and the carrier of the power conversion apparatus.

According to a third aspect, a charging apparatus is provided. The charging apparatus includes a plurality of power conversion apparatuses and a direct current bus, where the plurality of power conversion apparatuses are disposed in parallel, and each of the plurality of power conversion apparatuses includes an alternating current-direct current (AC-DC) conversion circuit; a power controller, where the power controller is connected to the AC-DC conversion circuit, and the power controller is configured to control the AC-DC conversion circuit to receive an alternating current, convert the alternating current into a first direct current, and output the first direct current through the direct current bus; and a circulating current controller. The plurality of power conversion apparatuses include a primary power conversion apparatus and at least one secondary power conversion apparatus. A circulating current controller of the primary power conversion apparatus is a primary circulating current controller. A circulating current controller of the secondary power conversion apparatus is a secondary circulating current controller. The primary circulating current controller is configured to send a synchronization signal to the secondary circulating current controller through a controller area network (CAN) bus. The synchronization signal is used to synchronize a carrier of the secondary power conversion apparatus with a carrier of the primary power conversion apparatus.

The plurality of power conversion apparatuses in the charging apparatus are set as the primary power conversion apparatus and the at least one secondary power conversion apparatus, and the primary circulating current controller of the primary power conversion apparatus sends the synchronization signal to the secondary circulating current controller of the secondary power conversion apparatus through the CAN bus, so that the carrier of each secondary power conversion apparatus is synchronized with the carrier of the primary power conversion apparatus. In this way, a high-frequency circulating current component in a circulating current between the power conversion apparatuses in the charging apparatus can be suppressed. This helps reduce a loss of each power conversion apparatus, ensure power conversion efficiency of each power conversion apparatus, and improve running stability of the charging apparatus. In addition, no additional hardware device needs to be added. Therefore, costs are low, and production is facilitated.

In addition, each power conversion apparatus in the charging apparatus communicates and interacts with each other through the CAN bus, to transmit the synchronization signal. Therefore, a network topology structure is simple, communication efficiency is high, and low-cost production is better facilitated.

With reference to the third aspect, in some implementations of the third aspect, the primary circulating current controller includes a first primary timer, and the secondary circulating current controller includes a second primary timer. The first primary timer is configured to adjust, based on edge triggering of the synchronization signal, a period of the carrier of the primary power conversion apparatus to be synchronized with a target carrier period. The second primary timer is configured to adjust, based on edge triggering of the synchronization signal, a period of the carrier of the secondary power conversion apparatus to be synchronized with the target carrier period.

With reference to the third aspect, in some implementations of the third aspect, the primary circulating current controller further includes a first secondary timer, and the secondary circulating current controller further includes a second secondary timer. The first secondary timer is connected to the first primary timer, and the second secondary timer is connected to the second primary timer. The first primary timer is further configured to: when a count value of the first primary timer is a period value of the target carrier period, send a first trigger signal to the first secondary timer. The first trigger signal indicates to reset a count value of the first secondary timer, so that the first primary timer is synchronized with the first secondary timer. The second primary timer is further configured to: when a count value of the second primary timer is the period value of the target carrier period, send a second trigger signal to the second secondary timer. The second trigger signal indicates to reset a count value of the second secondary timer, so that the second primary timer is synchronized with the second secondary timer.

With reference to the third aspect, in some implementations of the third aspect, the primary circulating current controller further includes a synchronization timer. The synchronization timer is connected to the first primary timer and the second primary timer. The synchronization timer is configured to: when a count value of the synchronization timer is a first period value, send the synchronization signal to the first primary timer and the second primary timer.

With reference to the third aspect, in some implementations of the third aspect, the power conversion apparatus further includes a circulating current detection circuit, and the AC-DC conversion circuit includes a plurality of switches. The circulating current detection circuit is connected to an input end of the AC-DC conversion circuit and the circulating current controller. The circulating current detection circuit is configured to: detect a circulating current value at the input end of the AC-DC conversion circuit and transmit the circulating current value to the circulating current controller. The circulating current controller is configured to: receive a first modulated wave from the power controller and adjust the first modulated wave based on the circulating current value, to obtain a second modulated wave. The second modulated wave is used to determine a drive signal. The drive signal is used to control turn-on time of the plurality of switches.

With reference to the third aspect, in some implementations of the third aspect, the circulating current controller is further configured to: determine a circulating current deviation based on the circulating current value and a preset circulating current threshold, perform operation adjustment on the circulating current deviation, to obtain a first compensation amount, and perform superposition processing on the first compensation amount and the first modulated wave, to obtain the second modulated wave.

With reference to the third aspect, in some implementations of the third aspect, the operation adjustment includes any one of a proportion operation, a proportion integral operation, and a proportion integral derivative operation.

With reference to the third aspect, in some implementations of the third aspect, the circulating current controller is further configured to send the second modulated wave to the power controller. The power controller is further configured to determine the drive signal based on the second modulated wave and the carrier of the power conversion apparatus.

With reference to the third aspect, in some implementations of the third aspect, the charging apparatus further includes an energy storage unit. The energy storage unit is connected to the direct current bus. The AC-DC conversion circuit is further configured to output the first direct current to the energy storage unit through the direct current bus.

With reference to the third aspect, in some implementations of the third aspect, the charging apparatus further includes a direct current-direct current (DC-DC) conversion apparatus. An input end of the DC-DC conversion apparatus is connected to the direct current bus. An output end of the DC-DC conversion apparatus is configured to be connected to a vehicle. The DC-DC conversion apparatus is configured to: receive the first direct current through the direct current bus, convert the first direct current into a second direct current, and output the second direct current to the vehicle, to supply power to the vehicle.

With reference to the third aspect, in some implementations of the third aspect, the charging apparatus further includes at least one charging terminal. The at least one charging terminal is connected to the DC-DC conversion apparatus. Each of the at least one charging terminal is configured to connect to a vehicle, so that the DC-DC conversion apparatus charges, by using each charging terminal, the vehicle connected to the charging terminal.

According to a fourth aspect, a charging system is provided. The charging system includes the charging apparatus in the foregoing third aspect and a vehicle. The charging apparatus is configured to charge the vehicle.

For beneficial effects of the second aspect to the fourth aspect, refer to the beneficial effects of the first aspect. Details are not described herein again.

DETAILED DESCRIPTION OF EMBODIMENTS

For ease of understanding, terms in the embodiments are first described.

Circulating current: may be a current that flows between a plurality of power conversion apparatuses connected in parallel. Because the current does not flow to a load/power grid, the current is referred to as a circulating current. The circulating current may include a low-frequency circulating current component and a high-frequency circulating current component. A current frequency of the low-frequency circulating current component is less than a current frequency of the high-frequency circulating current component.

Three-phase alternating current: may be a power system including three alternating current circuits with a same frequency, a same potential amplitude, and a phase difference of 120 degrees.

For ease of understanding of the embodiments, the following descriptions are first provided.

In the descriptions of the embodiments, a "connection" may be understood as an electrical connection. A connection between two electrical elements may be a direct connection or an indirect connection between the two electrical elements to transmit a signal. For example, a connection between A and B may be understood as that A is directly connected to B, or A is indirectly connected to B by using one or more other electrical elements.

In the descriptions of the embodiments, unless otherwise specified, "/" indicates "or". For example, A/B may indicate A or B. The term "and/or" only describes an association relationship between associated objects and indicates that three relationships may exist. For example, A and/or B may indicate the following three cases: only A exists, both A and B exist, and only B exists.

The terms "first" and "second" in the embodiments are merely intended for a purpose of description and shall not be understood as an indication or implication of relative importance or implicit indication of a quantity of indicated features. Therefore, a feature limited by "first" or "second" may explicitly or implicitly include one or more features. In addition, in the descriptions of the embodiments, "a plurality of" means two or more, and "at least one" and "one or more" means one, two, or more. The terms "one", "a", "the", "the foregoing", "this", and "the one" of singular forms are also intended to include expressions such as "one or more", unless otherwise specified in the context clearly.

The following describes the embodiments with reference to the accompanying drawings.

First, for ease of understanding of the power conversion apparatus provided in this embodiment, the following first describes an application scenario of the power conversion apparatus.

Figure 1:
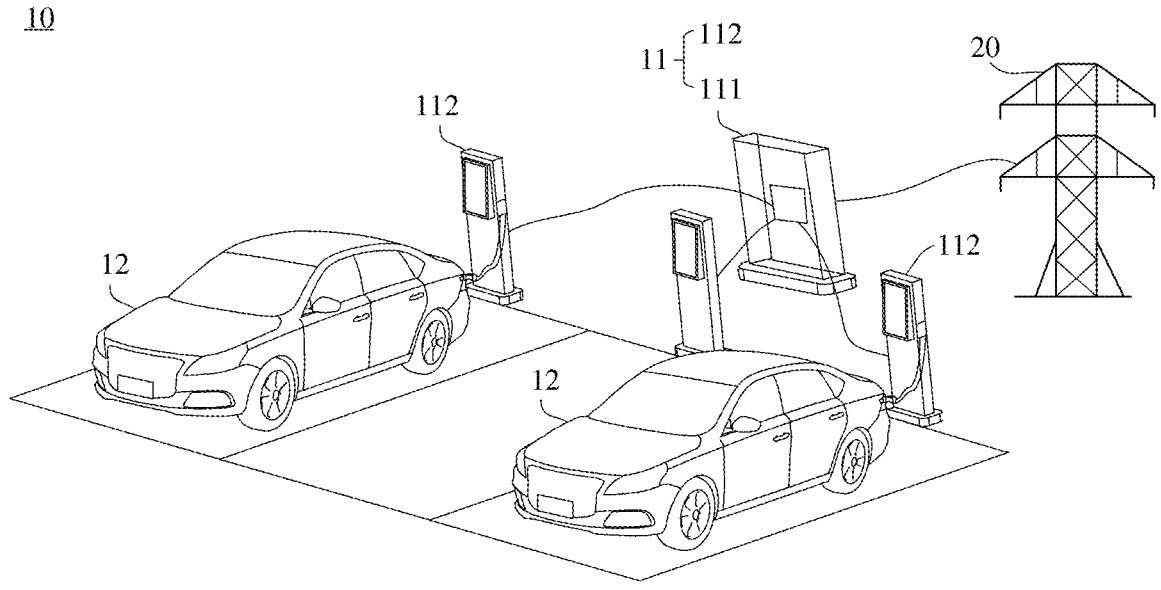
FIG. 1 is a diagram of a structure of a charging system according to an embodiment.
Figure 2:
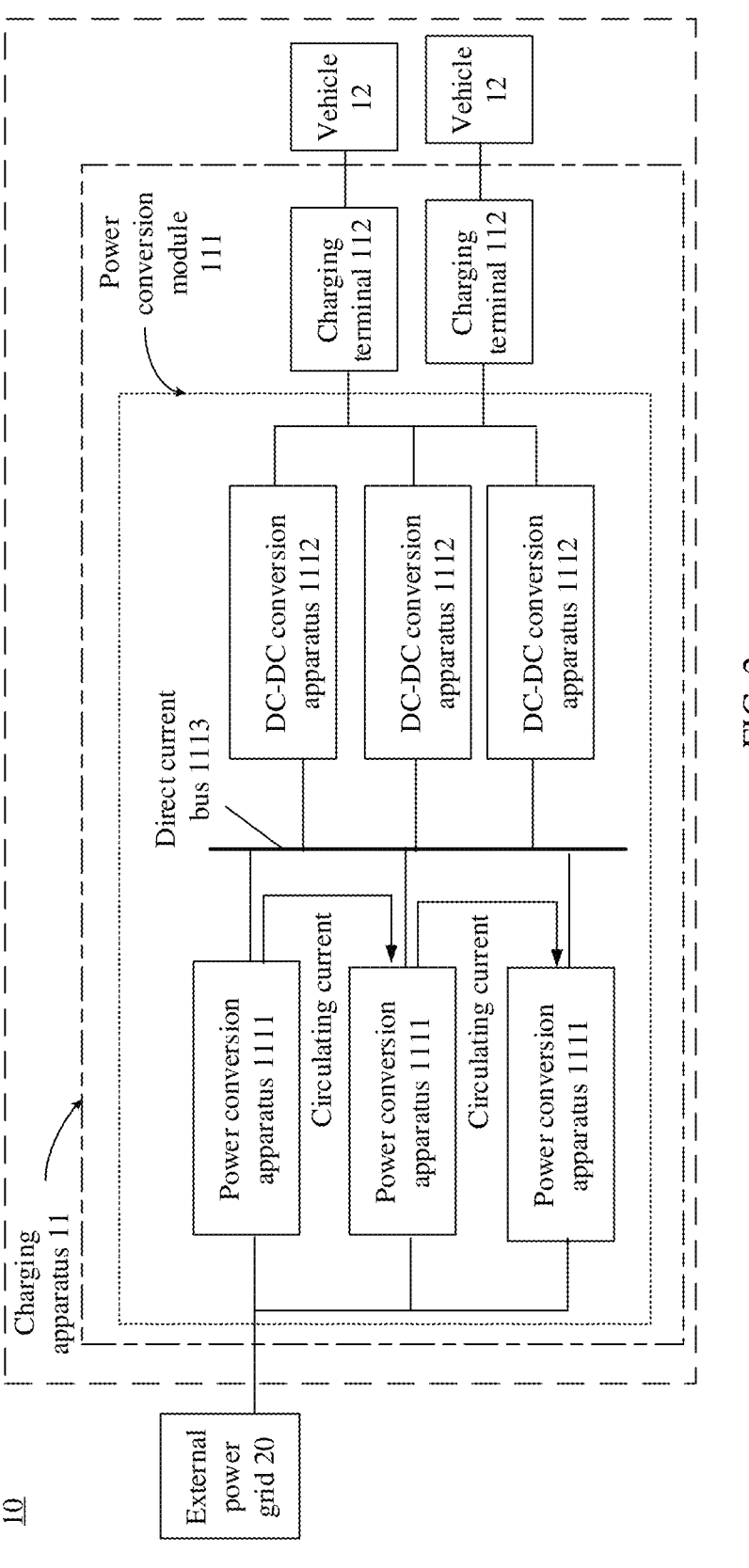
FIG. 2 is a diagram of an electrical connection of the charging system shown in FIG. 1.

FIG. 1 is a diagram of a structure of a charging system 10 according to an embodiment. FIG. 2 is a diagram of an electrical connection of the charging system 10 shown in FIG. 1.

It should be understood that a power transmission line is represented by a solid connection line in FIG. 2. For example, a solid connection line between an external power grid 20 and a power conversion apparatus 1111 in FIG. 2 represents a power transmission line for the external power grid 20 to input an alternating current to the power conversion apparatus 1111.

With reference to FIG. 1 and FIG. 2, the charging system 10 may include a charging apparatus 11 and a vehicle 12. The charging apparatus 11 may include a power conversion module 111 and at least one charging terminal 112 connected to the power conversion module 111, and each of the at least one charging terminal 112 is connected to the vehicle 12. During implementation, one charging terminal 112 may be connected to one vehicle 12, or a plurality of charging terminals 112 may be connected to one vehicle 12.

The power conversion module 111 may be configured to: receive an alternating current input by the external power grid 20, convert the alternating current into a stable direct current, and transmit the stable direct current to the charging terminal 112. The charging terminal 112 may transmit, to the vehicle 12, the stable direct current converted by the power conversion module 111, to charge the vehicle 12.

As shown in FIG. 2, the power conversion module 111 may include a plurality of power conversion apparatuses 1111, a plurality of DC-DC conversion apparatuses 1112, and a direct current bus 1113.

Input ends of the plurality of power conversion apparatuses 1111 may be connected to the external power grid 20, and output ends of the plurality of power conversion apparatuses 1111 may be connected to the direct current bus 1113. In other words, the plurality of power conversion apparatuses 1111 may be connected in parallel between the external power grid 20 and the direct current bus 1113. The plurality of power conversion apparatuses 111 may be configured to receive an alternating current from the external power grid 20, convert the alternating current into a direct current, and output the direct current through the direct current bus 1113. In other words, the power conversion apparatus 111 may be an AC-DC conversion apparatus.

An input end of the DC-DC conversion apparatus 1112 may be connected to the direct current bus 1113, and an output end of the DC-DC conversion apparatus 1112 may be connected to the charging terminal 112. The DC-DC conversion apparatus 1112 may receive, through the direct current bus 1113, direct currents output by the plurality of power conversion apparatuses 1111, further convert the direct currents into direct currents applicable to the vehicle 12 and transmit the direct currents to the vehicle 12 by using the charging terminal 112, to charge the vehicle 12.

The charging terminal 112 may include a housing, a human-computer interaction interface, a charging control unit, a metering and charging unit, and the like. The charging terminal 112 may be configured to perform information interaction, energy transmission, metering and charging, and the like with the vehicle 12.

The vehicle 12 may be a transportation device driven by electric energy to travel. The vehicle 12 may be a new energy vehicle. The new energy vehicle may be a pure electric vehicle (EV), a hybrid electric vehicle (HEV), a range extended electric vehicle (REEV), a plug-in hybrid electric vehicle (PHEV), or the like.

In the power conversion module 111, the plurality of power conversion apparatuses 1111 are connected in parallel, and each power conversion apparatus 1111 converts power of the alternating current output by the external power grid 20, to improve an alternating current-direct current power conversion capability of the charging apparatus 11. In this way, high-power charging of the vehicle 12 by the charging apparatus 11 is implemented.

However, the power conversion apparatus 1111 may be non-isolated, and a circulating current (as shown by a dashed arrow in FIG. 2) is easily generated between the plurality of power conversion apparatuses 1111 connected in parallel. The circulating current may be classified into a high-frequency circulating current component and a low-frequency circulating current component. The high-frequency circulating current component may be caused by asynchronization of carrier signals of the plurality of power conversion apparatuses 1111. The low-frequency circulating current component may be caused by inconsistency of modulated wave signals caused by differences in hardware parameters, control parameters, and the like of the plurality of power conversion apparatuses 1111. However, both the high-frequency circulating current component and the low-frequency circulating current component cause an increase in a loss of the power conversion apparatus 1111 and a decrease in power conversion efficiency. Consequently, running stability of the charging apparatus 11 is affected.

To suppress the circulating current between the plurality of power conversion apparatuses 1111, currently, a manner of adding an additional hardware isolation device may be used. For example, a passive filter component or an isolation transformer is added at the input end of each power conversion apparatus 1111, to block a path of the circulating current. However, costs and a size of the charging apparatus 11 are additionally increased in the foregoing manner.

Based on the foregoing content, the embodiments provide a power conversion apparatus and a charging apparatus, to suppress a circulating current between a plurality of power conversion apparatuses connected in parallel, to improve running stability of the charging apparatus.

Figure 3:
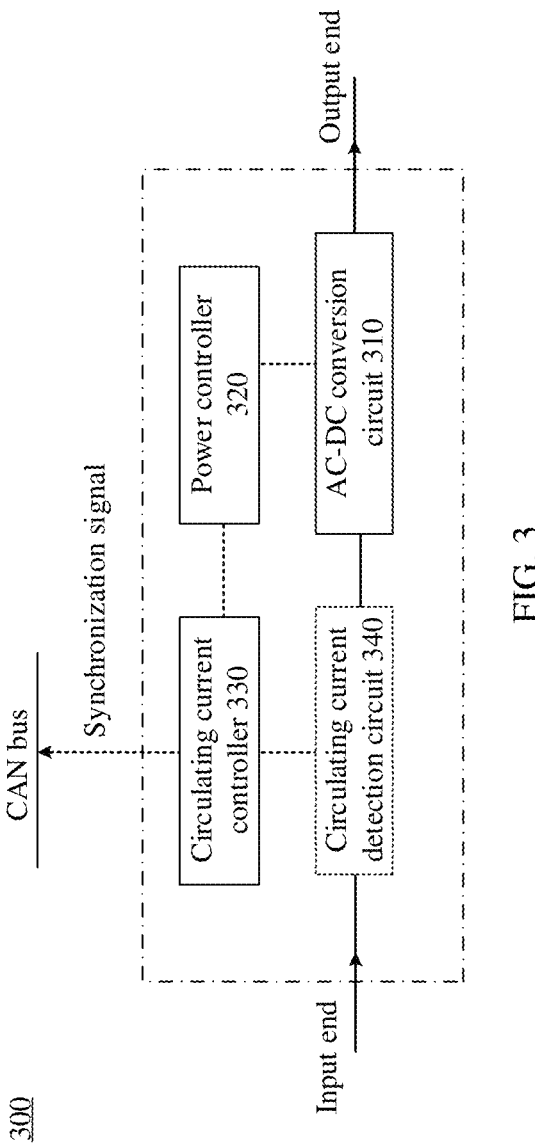
FIG. 3 is a diagram of a structure of a power conversion apparatus according to an embodiment.

FIG. 3 is a diagram of a structure of a power conversion apparatus 300 according to an embodiment.

It should be understood that in FIG. 3, a solid connection line represents a power transmission line, and a dashed connection line represents a signal transmission line. For example, in FIG. 3, a solid connection line between an input end and an AC-DC conversion circuit 310 represents a power transmission line for transmitting an alternating current from the input end of the power conversion apparatus 300 to the AC-DC conversion circuit 310, and a dashed connection line between a power controller 320 and the AC-DC conversion circuit 310 represents a signal transmission line for transmitting a control signal between the power controller 320 and the AC-DC conversion circuit 310.

The power conversion apparatus 300 may include the AC-DC conversion circuit 310, the power controller 320, and a circulating current controller 330.

An input end of the AC-DC conversion circuit 310 may be connected to an external power grid (not shown in the figure), to receive an alternating current output by the external power grid. The AC-DC conversion circuit 310 may convert power of the alternating current to obtain a first direct current and output the first direct current by using an output end of the AC-DC conversion circuit 310.

It may be understood that, in this embodiment, the alternating current output by the external power grid may be referred to as a mains supply, and the mains supply may be a three-phase alternating current.

The power controller 320 may be connected to the AC-DC conversion circuit 310. The power controller 320 may be configured to control the AC-DC conversion circuit 310 to receive the alternating current, convert the alternating current into the first direct current, and output the first direct current.

In some embodiments, the power controller 320 may be any one of a central processor unit (CPU), a network processor (NP), a digital signal processor (DSP), a micro controller unit (MCU), and a programmable logic device (PLD).

The circulating current controller 330 may be configured to send a synchronization signal to another power conversion apparatus through a controller area network (CAN) bus, or the circulating current controller 330 may be configured to receive a synchronization signal from another power conversion apparatus through a CAN bus.

The power conversion apparatus 300 may be connected to the another power conversion apparatus in parallel, to form a parallel system. Both the power conversion apparatus 300 and the another power conversion apparatus may be configured to: receive the alternating current output by the external power grid, convert the alternating current into the first direct current, and output the first direct current, so that the parallel system has a high alternating current-direct current power conversion capability. In addition, in the parallel system, carrier synchronization may be implemented, through transmission of the synchronization signal, between the power conversion apparatuses connected in parallel. A power conversion apparatus for sending the synchronization signal may be referred to as a primary power conversion apparatus, and a power conversion apparatus for receiving the synchronization signal may be referred to as a secondary power conversion apparatus.

In a possible case, in the parallel system, the power conversion apparatus 300 may be used as the primary power conversion apparatus, and the another power conversion apparatus may be used as the secondary power conversion apparatus. As shown in FIG. 3, in the power conversion apparatus 300 used as the primary power conversion apparatus, the circulating current controller 330 may be communicatively connected, through the CAN bus, to the another power conversion apparatus used as the secondary power conversion apparatus, to send the synchronization signal to the another power conversion apparatus. The synchronization signal is used to synchronize a carrier of the another power conversion apparatus with a carrier of the power conversion apparatus 300. It may be understood that, in the parallel system, there may be one or more another power conversion apparatuses used as secondary power conversion apparatuses.

In another possible case, in the parallel system, the power conversion apparatus 300 may be used as the secondary power conversion apparatus, and the another power conversion apparatus may be used as the primary power conversion apparatus. In the power conversion apparatus 300 used as the secondary power conversion apparatus, the circulating current controller 330 may be communicatively connected, through the CAN bus, to the another power conversion apparatus used as the primary power conversion apparatus, to receive the synchronization signal sent by the another power conversion apparatus. The synchronization signal is used to synchronize a carrier of the power conversion apparatus 300 with a carrier of the another power conversion apparatus. It may be understood that, in the parallel system, there may be one or more power conversion apparatuses 300 used as secondary power conversion apparatuses.

It may be further understood that, in this embodiment, carrier synchronization may mean that phases of carriers of two power conversion apparatuses connected in parallel are the same. For example, synchronizing the carrier of the power conversion apparatus 300 with the carrier of the another power conversion apparatus may mean that a phase of the carrier of the power conversion apparatus 300 is the same as that of the carrier of the another power conversion apparatus.

For example, the circulating current controller 330 may be a DSP.

In this embodiment, when the power conversion apparatus 300 is connected to the another power conversion apparatus in parallel, the circulating current controller 330 disposed in the power conversion apparatus 300 may be used to send the synchronization signal to the another power conversion apparatus through the CAN bus, or receive, through the CAN bus, the synchronization signal sent by the another power conversion apparatus, so that the carrier of the power conversion apparatus 300 is synchronized with the carrier of the another power conversion apparatus. In this way, a high-frequency circulating current component in a circulating current between the power conversion apparatuses connected in parallel can be suppressed. This helps reduce a loss of each power conversion apparatus, ensure power conversion efficiency of each power conversion apparatus, and improve running stability of the power conversion apparatuses connected in parallel. In addition, no additional hardware device needs to be added. Therefore, costs are low, and production is facilitated.

In addition, currently, a plurality of power conversion apparatuses may communicate and interact with each other by using the Ethernet, to transmit a signal. The Ethernet is connection of LAN switches. A LAN switch having a large quantity of interfaces may be required. In a network topology structure, there are a large quantity of interconnection lines, and a topology structure is complex. In addition, a high-performance LAN switch also causes high costs. However, in this embodiment, a LAN switch does not need to be used between the power conversion apparatus 300 and the another power conversion apparatus. Instead, the power conversion apparatus 300 directly communicates and interacts with the another power conversion apparatus through the CAN bus, to transmit the synchronization signal. Therefore, a network topology structure is simpler, communication efficiency is higher, and low-cost production is better facilitated.

An implementation in which the carrier of the power conversion apparatus 300 is synchronized with the carrier of the another power conversion apparatus by using the synchronization signal is described below, and the foregoing is merely a brief description.

In some embodiments, the power conversion apparatus 300 may further include a circulating current detection circuit 340, and the AC-DC conversion circuit 310 may include a plurality of switches. The circulating current detection circuit 340 may be connected to the input end of the AC-DC conversion circuit 310 and the circulating current controller 330. The circulating current detection circuit 340 may be configured to: detect a circulating current value at the input end of the AC-DC conversion circuit 310 and send the circulating current value to the circulating current controller 330.

It may be understood that the circulating current value may be a magnitude of a current that flows into the AC-DC conversion circuit 310 from the another power conversion apparatus when the power conversion apparatus 300 is connected to the another power conversion apparatus in parallel.

The circulating current controller 330 may be connected to the power controller 320, to transmit a signal. The circulating current controller 330 may be configured to: receive a first modulated wave from the power controller 320 and adjust the first modulated wave based on the circulating current value obtained from the circulating current detection circuit 340, to obtain a second modulated wave. The second modulated wave may be used to determine a drive signal. The drive signal is used to control turn-on time of the plurality of switches in the AC-DC conversion circuit 210.

During implementation, the circulating current controller 330 may send the second modulated wave obtained through adjustment to the power controller 320, and the power controller 320 may determine the drive signal based on the second modulated wave and the carrier of the power conversion apparatus 300.

It should be noted that the switch in this embodiment may be one or more of a plurality of types of switching transistors, such as a metal-oxide-semiconductor field-effect transistor (MOSFET), a bipolar junction transistor (BJT), an insulated gate bipolar transistor (IGBT), or a silicon carbide (SiC) transistor. This is not limited. A package form of each switching transistor may be single-transistor package or multi-transistor package.

In this embodiment, the circulating current detection circuit 340 is disposed in the power conversion apparatus 300, so that the circulating current value input to the AC-DC conversion circuit 310 can be detected in real time. The circulating current controller 330 may perform, based on the circulating current value, compensation adjustment on the first modulated wave output by the power controller 320, and send the second modulated wave obtained through adjustment to the power controller 320. Further, the power controller 320 controls the turn-on time of the plurality of switches in the AC-DC conversion circuit 310 by using the drive signal generated based on the second modulated wave, so that a low-frequency circulating current component in the AC-DC conversion circuit 310 can reach a preset circulating current threshold. The preset circulating current threshold may be, for example, 0. In this way, when a plurality of power conversion apparatuses 300 are connected in parallel, a low-frequency circulating current component in a circulating current between the power conversion apparatuses 300 can be suppressed. This helps reduce a loss of the power conversion apparatus 300, ensure power conversion efficiency of the power conversion apparatus 300, and improve running stability of the plurality of power conversion apparatuses 300 connected in parallel.

The foregoing briefly describes the power conversion apparatus provided in embodiments. The following further describes the power conversion apparatus provided in embodiments with reference to the charging apparatus provided in embodiments.

Figure 4:
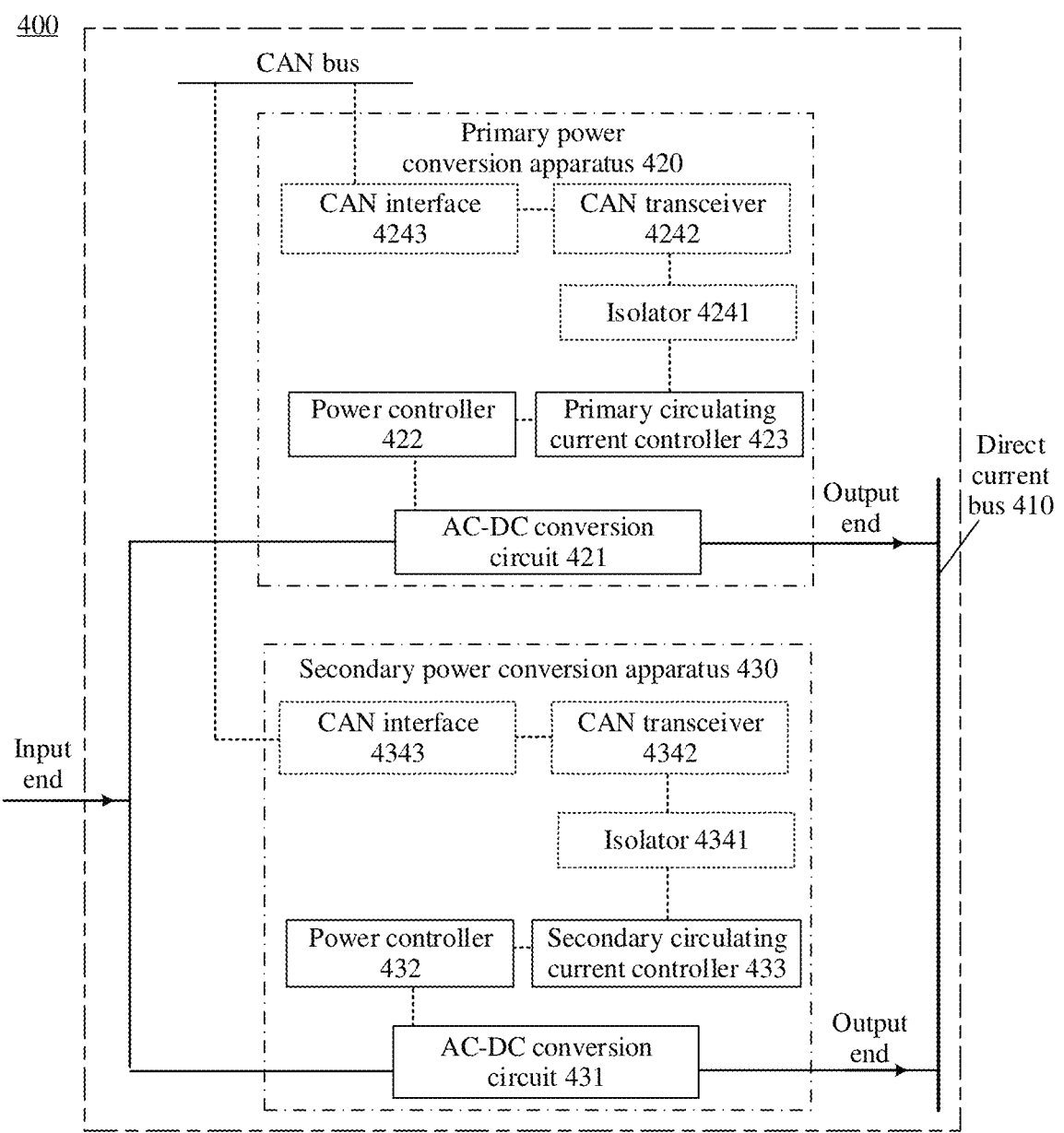
FIG. 4 is a diagram of a structure of a charging apparatus according to an embodiment.

FIG. 4 is a diagram of a structure of a charging apparatus 400 according to an embodiment. It should be understood that in FIG. 4, a solid connection line represents a power transmission line, and a dashed connection line represents a signal transmission line.

The charging apparatus 400 may include a direct current bus 410 and a plurality of power conversion apparatuses. The plurality of power conversion apparatuses may be disposed in parallel between an external power grid (not shown in the figure) and the direct current bus 410. It may be understood that the direct current bus 410 may include a positive bus and a negative bus, and an output end of each of the plurality of power conversion apparatuses may be connected to the positive bus and the negative bus.

The plurality of power conversion apparatuses may include a primary power conversion apparatus 420 and at least one secondary power conversion apparatus 430. The primary power conversion apparatus 420 and the secondary power conversion apparatus 430 may be separately the power conversion apparatus 300.

It may be understood that the primary power conversion apparatus 420 and the secondary power conversion apparatus 430 may be preset in the plurality of power conversion apparatuses connected in parallel. For example, in the plurality of power conversion apparatuses, a power conversion apparatus with a smallest apparatus identification number may be set as the primary power conversion apparatus 420, and another power conversion apparatus other than the power conversion apparatus with the smallest apparatus identification number may be set as the secondary power conversion apparatus 430 based on an apparatus identification number.

It should be noted that the foregoing manner of setting the primary power conversion apparatus 420 and the secondary power conversion apparatus 430 based on an apparatus identification number is merely an example. During implementation, a manner of setting the primary power conversion apparatus 420 and the secondary power conversion apparatus 430 in the plurality of power conversion apparatuses may be adjusted based on actual production and design requirements.

For example, the plurality of power conversion apparatuses may include the primary power conversion apparatus 420 and one, two, or three secondary power conversion apparatuses 430. It should be understood that, for case of description and understanding, an example in which the plurality of power conversion apparatuses include the primary power conversion apparatus 420 and one secondary power conversion apparatus 430 is used for description in this embodiment.

The primary power conversion apparatus 420 may include an AC-DC conversion circuit 421, a power controller 422, and a primary circulating current controller 423. The secondary power conversion apparatus 430 may include an AC-DC conversion circuit 431, a power controller 432, and a secondary circulating current controller 433. Input ends of the AC-DC conversion circuit 421 and the AC-DC conversion circuit 431 may be connected to the external power grid in parallel, and output ends of the AC-DC conversion circuit 421 and the AC-DC conversion circuit 431 may be connected to the direct current bus 410 in parallel. In other words, the AC-DC conversion circuit 421 and the AC-DC conversion circuit 431 may be connected in parallel between the external power grid and the direct current bus 410.

The primary circulating current controller 423 may be communicatively connected to the secondary circulating current controller 433 through a CAN bus, so that the primary circulating current controller 423 can send a synchronization signal to the secondary circulating current controller 433 through the CAN bus. The synchronization signal may be used to synchronize a carrier of the secondary power conversion apparatus 430 with a carrier of the primary power conversion apparatus 420.

During implementation, in some embodiments, the primary power conversion apparatus 420 may include an isolator 4241, a CAN transceiver 4242, and a CAN interface 4243, and the secondary power conversion apparatus 430 may include an isolator 4341, a CAN transceiver 4342, and a CAN interface 4343. The primary circulating current controller 423, the isolator 4241, the CAN transceiver 4242, and the CAN interface 4243 are sequentially connected to each other. The secondary circulating current controller 433, the isolator 4341, the CAN transceiver 4342, and the CAN interface 4343 are sequentially connected to each other. In addition, the CAN interface 4243 and the CAN interface 4343 are separately connected to the CAN bus, so that the primary circulating current controller 423 can communicate and interact with the secondary circulating current controller 433 through the CAN bus, to transmit the synchronization signal.

For the non-detailed parts of the primary power conversion apparatus 420 and the secondary power conversion apparatus 430, refer to the embodiment shown in FIG. 3. Details are not described herein again.

In some embodiments, the primary circulating current controller 423 and the secondary circulating current controller 433 may implement carrier synchronization between the primary power conversion apparatus 420 and the secondary power conversion apparatus 430 based on a plurality of timers and by using the synchronization signal.

With reference to the accompanying drawings, the following describes an example of a manner in which the primary circulating current controller 423 and the secondary circulating current controller 433 implement carrier synchronization based on the plurality of timers and by using the synchronization signal.

Figures 5, 6:
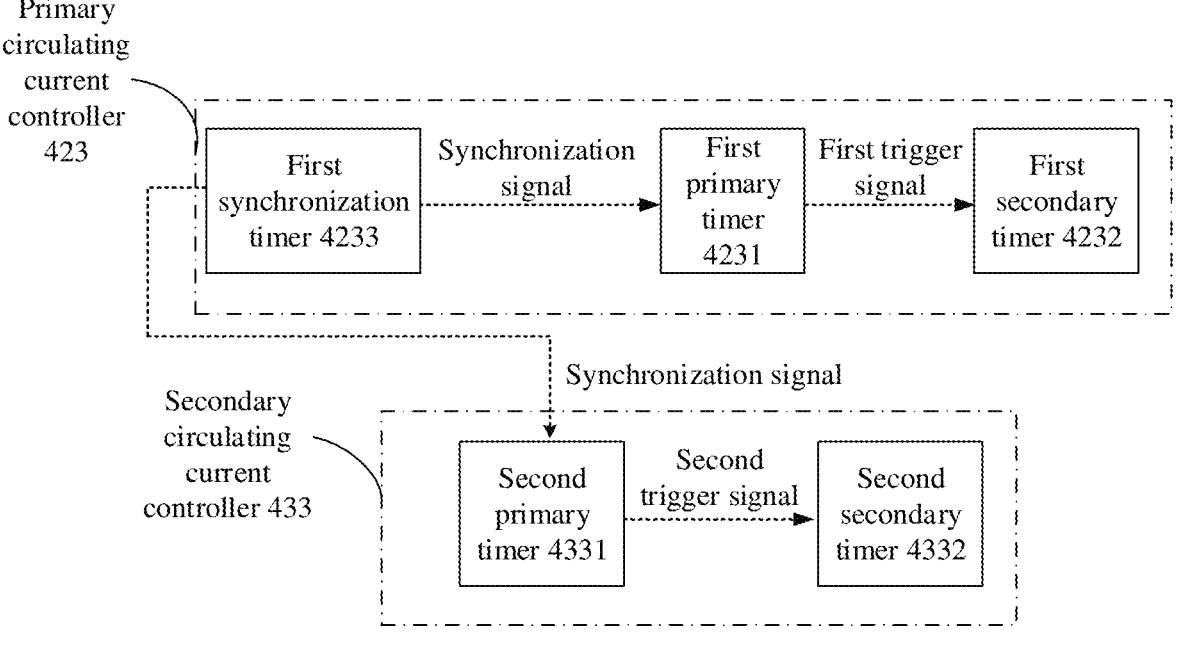
FIG. 5 is an example of a primary circulating current controller 423 and a secondary circulating current controller 433 according to an embodiment.
FIG. 6 is a synchronization time sequence diagram of an example of a synchronization signal according to an embodiment.

FIG. 5 is a diagram of an example of the primary circulating current controller 423 and the secondary circulating current controller 433 according to an embodiment. It should be understood that a dashed connection line in FIG. 5 represents a signal transmission line.

In some embodiments, the primary circulating current controller 423 may include a first primary timer 4231, a first secondary timer 4232, and a synchronization timer 4233, and the secondary circulating current controller 433 may include a second primary timer 4331 and a second secondary timer 4332. The first primary timer 4231 is connected to the first secondary timer 4231. The second primary timer 4331 is connected to the second secondary timer 4332. The first primary timer 4231 and the second primary timer 4331 are separately connected to the synchronization timer 4233.

The synchronization timer 4233 may be configured to: when a count value of the synchronization timer 4233 is a first period value, send the synchronization signal to the first primary timer 4231 and the second primary timer 4331. The first period value may be a period value of the synchronization signal.

The first primary timer 4231 may be configured to adjust, based on edge triggering of the synchronization signal, a period of the carrier of the primary power conversion apparatus 420 to be synchronized with a target carrier period. The second primary timer 4331 may be further configured to adjust, based on edge triggering of the synchronization signal, a period of the carrier of the secondary power conversion apparatus 430 to be synchronized with the target carrier period. In this way, both the period of the carrier of the primary power conversion apparatus 420 and the period of the carrier of the secondary power conversion apparatus 430 are synchronized with the target carrier period. In other words, the carrier of the primary power conversion apparatus 420 is synchronized with the carrier of the secondary power conversion apparatus 430.

It may be understood that the target carrier period may be a preset carrier period, and a period value of the target carrier period may be flexibly adjusted based on an actual design requirement.

During implementation, the target carrier period and a target count value may be preset on the first primary timer 4231 and the second primary timer 4331. The target count value may be a count value ranging from 0 to a preset period in the target carrier period. The preset period may be, for example, ½ or ⅓ of the period value of the target carrier period.

The first primary timer 4231 may obtain a first count value based on edge triggering of the synchronization signal. The first count value may be a count value ranging from 0 to a preset period in a primary carrier period. The primary carrier period may be the period of the carrier of the primary power conversion apparatus 420. The first primary timer 4231 may compare the first count value with the target count value to fine-tune a period value of the primary carrier period, so that the primary carrier period is synchronized with the target carrier period, that is, the period of the carrier of the primary power conversion apparatus 420 is synchronized with the target carrier period.

Similarly, the second primary timer 4331 may obtain a second count value based on edge triggering of the synchronization signal. The second count value may be a count value ranging from 0 to a preset period in a secondary carrier period. The secondary carrier period may be the period of the carrier of the secondary power conversion apparatus 430. The second primary timer 4331 may compare the second count value with the target count value to fine-tune a period value of the secondary carrier period, so that the secondary carrier period is synchronized with the target carrier period, that is, the period of the carrier of the secondary power conversion apparatus 430 is synchronized with the target carrier period.

In this way, the carrier of the primary power conversion apparatus 420 is synchronized with the carrier of the secondary power conversion apparatus 430.

It may be understood that the edge triggering of the synchronization signal may be triggering at a rising edge of the synchronization signal or may be triggering at a falling edge of the synchronization signal. For example, as shown in FIG. 6, the first primary timer 4231 and the second primary timer 4331 may respectively obtain the first count value and the second count value based on triggering at the rising edge of the synchronization signal.

It may be further understood that in the charging apparatus 400, both the primary circulating current controller 423 and the secondary circulating current controller 433 include the synchronization timer, so that based on actual production and design requirements, any one of the plurality of power conversion apparatuses in the charging apparatus 400 can transmit the synchronization signal as the primary power conversion apparatus.

In some embodiments, the first primary timer 4231 may be configured to send a first trigger signal to the first secondary timer 4232 when a count value of the first primary timer 4231 is the period value of the target carrier period. The first trigger signal may indicate to reset a count value of the first secondary timer 4232. Correspondingly, in response to the first trigger signal, the first secondary timer 4232 may reset the count value of the first secondary timer 4232, so that the first primary timer 4231 is synchronized with the first secondary timer 4232, and the primary timer and the secondary timer in the primary power conversion apparatus 420 can output signals with a same frequency and a same phase. In this way, signals in the primary power conversion apparatus 420 are synchronized. Similarly, the second primary timer 4331 may be configured to send a second trigger signal to the second secondary timer 4332 when a count value of the second primary timer 4331 is the period value of the target carrier period. The second trigger signal may indicate to reset a count value of the second secondary timer 4332, so that the second primary timer 4331 is synchronized with the second secondary timer 4332, and the primary timer and the secondary timer in the secondary power conversion apparatus 430 output signals with a same frequency and a same phase. In this way, signals in the secondary power conversion apparatus 430 are synchronized.

It may be understood that, in this embodiment, resetting a count value may mean resetting the count value to 0.

It may be further understood that, in this embodiment, there may be separately a plurality of first secondary timers 4232 and a plurality of second secondary timers 4332, and quantities of first secondary timers 4232 and second secondary timers 4332 are equal. For example, there may be separately five first secondary timers 4232 and second secondary timers 4332, or there may be separately six first secondary timers 4232 and second secondary timers 4332.

For example, the primary timer and the secondary timer may be high resolution timers (HRTIMs).

In the charging apparatus 400 provided in this embodiment, the plurality of power conversion apparatuses in the charging apparatus 400 are set as the primary power conversion apparatus and the at least one secondary power conversion apparatus, and the primary circulating current controller of the primary power conversion apparatus sends the synchronization signal to the secondary circulating current controller of the secondary power conversion apparatus through the CAN bus, so that the carrier of each secondary power conversion apparatus is synchronized with the carrier of the primary power conversion apparatus. In this way, a high-frequency circulating current component in a circulating current between the power conversion apparatuses in the charging apparatus 400 can be suppressed. This helps reduce a loss of each power conversion apparatus, ensure power conversion efficiency of each power conversion apparatus, and improve running stability of the charging apparatus. In addition, no additional hardware device needs to be added. Therefore, costs are low, and production is facilitated.

In addition, each power conversion apparatus in the charging apparatus 400 communicates and interacts with each other through the CAN bus, to transmit the synchronization signal. Therefore, a network topology structure is simple, communication efficiency is high, and low-cost production is better facilitated.

Figure 7:
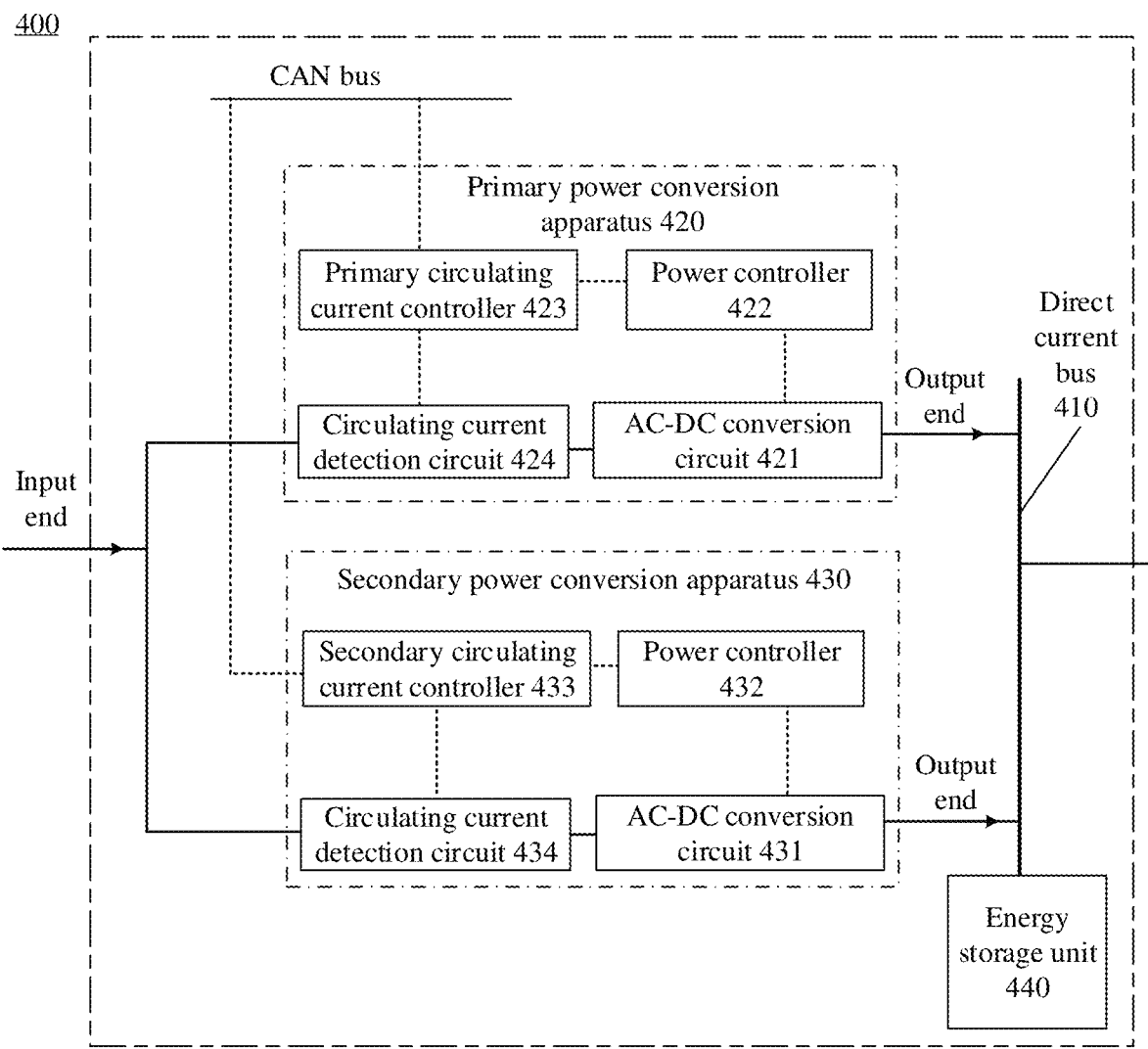
FIG. 7 is a diagram of a structure of a charging apparatus.

FIG. 7 is a diagram of a structure of another charging apparatus 400 according to an embodiment. It should be understood that in FIG. 7, a solid connection line represents a power transmission line, and a dashed connection line represents a signal transmission line.

It should be further understood that the charging apparatus 400 shown in FIG. 7 includes features of the charging apparatus 400 shown in FIG. 4 to FIG. 6. The following may describe differences between FIG. 7 and FIG. 4. Most same content thereof is not described again.

In some embodiments, the primary power conversion apparatus 420 may further include a circulating current detection circuit 424, and the AC-DC conversion circuit 421 may include a plurality of switches. The circulating current detection circuit 424 may be connected to an input end of the AC-DC conversion circuit 421 and the primary circulating current controller 423. The circulating current detection circuit 424 may be configured to: detect a circulating current value at the input end of the AC-DC conversion circuit 421 and send the circulating current value to the primary circulating current controller 423. The primary circulating current controller 423 may be configured to: receive a first modulated wave from the power controller 422 and adjust the first modulated wave based on the circulating current value, to obtain a second modulated wave. The second modulated wave may be used to determine a drive signal. The drive signal is used to control turn-on time of the plurality of switches in the AC-DC conversion circuit 421.

In a possible example, the primary circulating current controller 423 may be further configured to:

determine a circulating current deviation based on the circulating current value and a preset circulating current threshold;

perform operation adjustment on the circulating current deviation, to obtain a first compensation amount; and perform superposition processing on the first compensation amount and the first modulated wave output by the power controller 422, to obtain the second modulated wave.

For example, the preset circulating current threshold may be 0. The operation adjustment may include, for example, but is not limited to, any one of a proportional (P) operation, a proportional integral (PI) operation, and a proportional integral derivative (PID) operation.

It may be understood that during implementation, the primary circulating current controller 423 may determine, by using the preset circulating current threshold as a target, a deviation between the circulating current value and the preset circulating current threshold, and determine, based on the deviation, the first compensation amount for adjusting the first modulated wave output by the power controller 422. In this way, compensation adjustment is performed on the first modulated wave by using the first compensation amount, to obtain the second modulated wave.

In some embodiments, the primary circulating current controller 423 may be further configured to send the second modulated wave to the power controller 422. The power controller 422 may determine the drive signal based on the second modulated wave and the carrier of the primary power conversion apparatus 420.

In a possible example, the power controller 422 may include a pulse width modulation (PWM) unit. The PWM unit may be configured to: compare the second modulated wave obtained through compensation adjustment with the carrier of the primary power conversion apparatus 420, and adjust a duty cycle of the drive signal, so that the PWM unit can control the turn-on time of the plurality of switches in the AC-DC conversion circuit 421 by using the drive signal.

In this way, the low-frequency circulating current component in the AC-DC conversion circuit 421 reaches the preset circulating current threshold.

Similarly, in some embodiments, the secondary power conversion apparatus 430 may further include a circulating current detection circuit 434. The circulating current detection circuit 434 may be connected to an input end of the AC-DC conversion circuit 431 and the secondary circulating current controller 433.

For descriptions of determining a drive signal in the secondary power conversion apparatus 430 through the circulating current detection circuit 434, refer to the related descriptions of the primary power conversion apparatus 420. Details are not described herein again.

In the charging apparatus 400 provided in this embodiment, each power conversion apparatus (for example, the primary power conversion apparatus 420 and the secondary power conversion apparatus 430) is provided with the circulating current detection circuit, detects, through the circulating current detection circuit, a circulating current value input to the AC-DC conversion circuit, in real time, and transmits the circulating current value to the circulating current controller. The circulating current controller may use the preset circulating current threshold as a target, perform, based on the circulating current value, compensation adjustment on a modulated wave output by the power controller, and send the modulated wave obtained through adjustment to the power controller. Further, the power controller generates the drive signal based on the adjusted modulated wave, to control the turn-on time of the plurality of switches in the AC-DC conversion circuit, so that the low-frequency circulating current component in the AC-DC conversion circuit can reach the preset circulating current threshold. This helps suppress a low-frequency circulating current component in a circulating current in the charging apparatus 400 and improve running stability of the charging apparatus 400.

In some embodiments, the charging apparatus 400 may further include an energy storage unit 440. The energy storage unit 440 may be connected to the direct current bus 410, so that an output end of the AC-DC conversion circuit 421 and an output end of the AC-DC conversion circuit 431 can be connected to the energy storage unit 440 through the direct current bus 410. First direct currents output by the AC-DC conversion circuit 421 and the AC-DC conversion circuit 431 may be transmitted to the energy storage unit 440 through the direct current bus 410, to form an energy pool. The energy storage unit 440 may be, for example, a photovoltaic apparatus and/or an energy storage apparatus.

It may be understood that an implementation of the photovoltaic apparatus in this embodiment may be any manner in which a photovoltaic function can be implemented. For example, the photovoltaic apparatus may include at least one photovoltaic array. Each of the at least one photovoltaic array is connected to the direct current bus 410.

It may be further understood that an implementation of the energy storage apparatus in this embodiment may be any manner in which an electric energy storage function can be implemented. For example, the energy storage apparatus may be, for example, an energy storage battery pack or an energy storage converter.

In this embodiment, in light and storage access scenarios, the energy storage unit is superimposed on the direct current bus, so that first direct currents output by the plurality of power conversion apparatuses can be stored in the energy storage unit. In this way, light and storage are superimposed on a side of the direct current bus. When the charging apparatus 400 is configured to charge a vehicle, energy in the energy storage unit may be converted into a direct current applicable to the vehicle. Energy conversion efficiency is high.

The following describes an example of the charging apparatus 400 shown in FIG. 7 with reference to the accompanying drawings.

Figure 8:
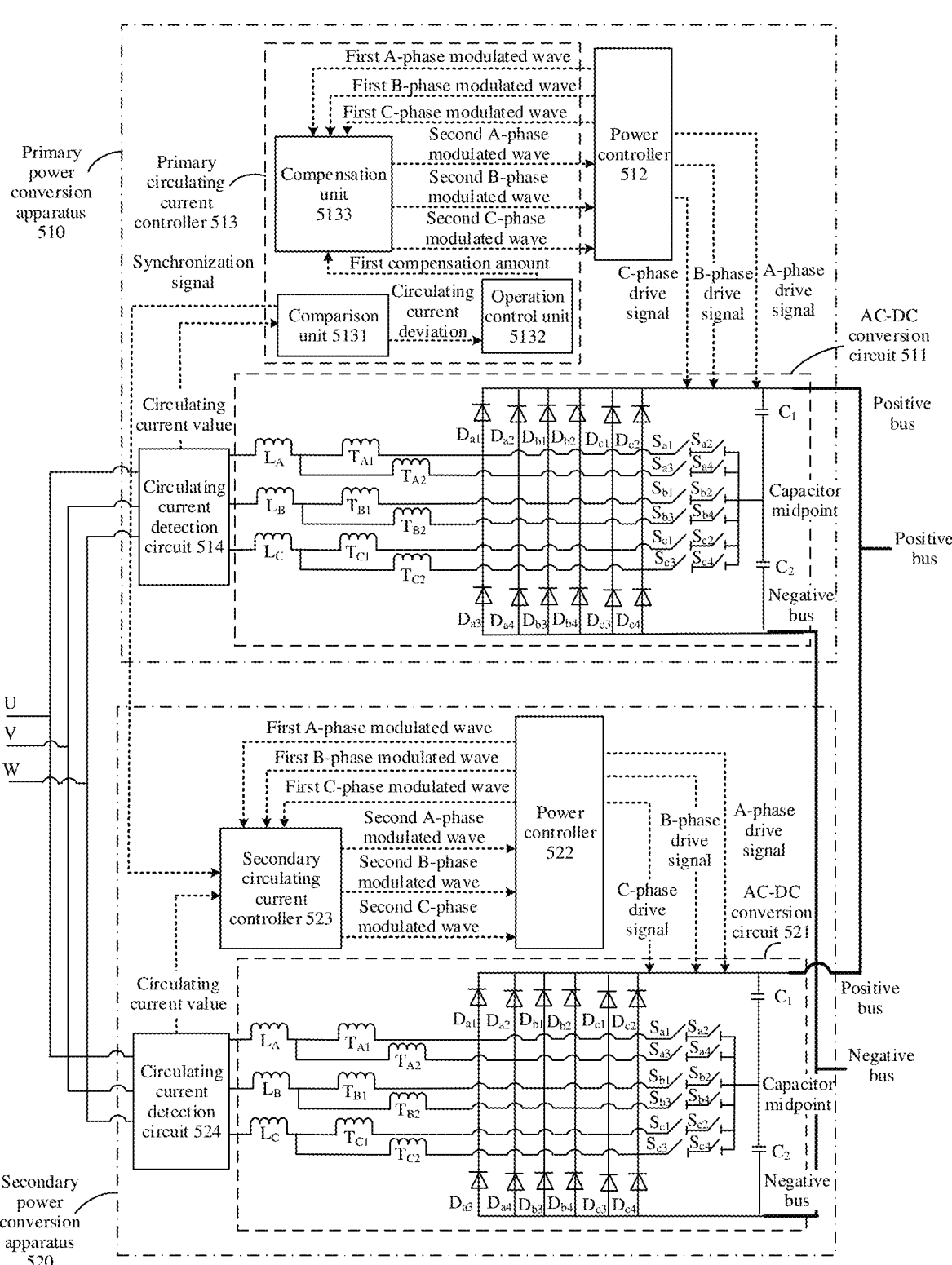
FIG. 8 is an example of a charging apparatus according to an embodiment.

FIG. 8 is an example of a charging apparatus 500 according to an embodiment. It should be understood that in FIG. 8, a solid connection line represents a power transmission line, and a dashed connection line represents a signal transmission line.

It should be further understood that the charging apparatus 500 may be an example of the charging apparatus 400 shown in FIG. 7.

The charging apparatus 500 may include a primary power conversion apparatus 510, a secondary power conversion apparatus 520, a positive bus, and a negative bus. The primary power conversion apparatus 510 may include an AC-DC conversion circuit 511, a power controller 512, a primary circulating current controller 513, and a circulating current detection circuit 514.

The following describes an example of a partial structure in the primary power conversion apparatus 510.

AC-DC Conversion Circuit 511

The AC-DC conversion circuit 511 may be a three-phase T-type interleaved Vienna rectifier circuit. The AC-DC conversion circuit 511 may include an input end, three dual-path power factor correction (PFC) conversion circuits (such as a dual-path PFC conversion circuit 1, a dual-path PFC conversion circuit 2, and a dual-path PFC conversion circuit 3), and a capacitor circuit.

The input end may include three phase wires: a first phase wire U, a second phase wire V, and a third phase wire W. Each phase wire may be configured to receive a corresponding one-phase alternating current, so that the AC-DC conversion circuit 511 can receive a three-phase alternating current from an external power grid. The first phase wire U, the second phase wire V, and the third phase wire W may be separately connected to one dual-path PFC conversion circuit, and each dual-path PFC conversion circuit is further connected to a capacitor midpoint of the capacitor circuit. A first end of the capacitor circuit may be connected to the positive bus, and a second end of the capacitor branch circuit may be connected to the negative bus. Each dual-path PFC conversion circuit has a same structure. Each dual-path PFC conversion circuit may include an inductor, two windings of an autotransformer, two switch bridge arms, and two diode bridge arms. The capacitor circuit may include a capacitor $C_1$ and a capacitor $C_2$ that are connected in series.

As shown in FIG. 8, the dual-path PFC conversion circuit 1 is used as an example. The PFC conversion circuit 1 may include an inductor $L_A$, two windings $T_{A1}$ and $T_{A2}$ of an autotransformer, a switch bridge arm 1, a switch bridge arm 2, a diode bridge arm 1, and a diode bridge arm 2. The switch bridge arm 1 includes a switching transistor $S_{a1}$ and a switching transistor $S_{a2}$ that are connected in series. The switch bridge arm 2 includes a switching transistor $S_{a3}$ and a switching transistor $S_{a4}$ that are connected in series. The diode bridge arm 1 includes a diode $D_{a1}$ and a diode $D_{a3}$ that are connected in series. The diode bridge arm 2 includes a diode $D_{a2}$ and a diode $D_{a4}$ that are connected in series. A left end of the inductor $L_A$ is connected to the first phase wire U, and a right end of the inductor $L_A$ is connected to left ends of the windings $T_{A1}$ and $T_{A2}$ of the autotransformer. A right end of the winding $T_{A1}$ of the autotransformer may be connected to both a left end of the switch bridge arm 1 and the diode bridge arm 1, and a right end of the winding $T_{A2}$ of the autotransformer may be connected to both a left end of the switch bridge arm 2 and the diode bridge arm 2. A right end of the switch bridge arm 1 and a right end of the switch bridge arm 2 may be connected to the capacitor midpoint of the capacitor circuit. The diode bridge arm 1 and the diode bridge arm 2 may be connected in parallel between an upper end and a lower end of the capacitor circuit. The upper end of the capacitor circuit may be connected to the positive bus, and the lower end of the capacitor circuit may be connected to the negative bus.

Correspondingly, the dual-path PFC conversion circuit 2 may include an inductor $L_B$, two windings $T_{B1}$ and $T_{B2}$ of an autotransformer, a switching transistor $S_{b1}$ and a switching transistor $S_{b2}$ that are connected in series, a switching transistor $S_{b3}$ and a switching transistor $S_{b4}$ that are connected in series, a diode $D_{b1}$ and a diode $D_{b3}$ that are connected in series, and a diode $D_{b2}$ and a diode $D_{b4}$ that are connected in series. A connection of the foregoing circuit components is similar to a connection structure of the PFC conversion circuit 1. For details, refer to the related descriptions of the foregoing PFC conversion circuit 1. Details are not described herein again.

Correspondingly, the PFC conversion circuit 3 may include an inductor $L_C$, two windings $T_{c1}$ and $T_{c2}$ of an autotransformer, a switching transistor $S_{c1}$ and a switching transistor $S_{c2}$ that are connected in series, a switching transistor $S_{c3}$ and a switching transistor $S_{c4}$ that are connected in series, a diode $D_{c1}$ and a diode $D_{c3}$ that are connected in series, and a diode $D_{c2}$ and a diode $D_{c4}$ that are connected in series. A connection of the foregoing circuit components is similar to a connection structure of the PFC conversion circuit 1. For details, refer to the related descriptions of the foregoing PFC conversion circuit 1. Details are not described herein again.

Optionally, in the AC-DC conversion circuit 511, at least some of the diodes may be replaced with controllable switching transistors.

It may be understood that in the AC-DC conversion circuit 511, the three dual-path PFC conversion circuits may be configured to receive the three-phase alternating current from the external power grid, convert the three-phase alternating current into a first direct current, and output the first direct current through the positive bus and the negative bus.

Primary Circulating Current Controller 513

The primary circulating current controller 513 may include a comparison unit 5131, an operation control unit 5132, and a compensation unit 5133.

The comparison unit 5131 may be configured to determine a circulating current deviation based on a circulating current value and a preset circulating current threshold. The operation control unit 5132 may be configured to perform operation adjustment on the circulating current deviation, to obtain a first compensation amount. The operation control unit 5132 may be, for example, any one of a P controller, a PI controller, and a PID controller. The compensation unit 5133 may be configured to perform superposition processing on the first compensation amount and a first modulated wave output by the power controller 512, to adjust and compensate for the first modulated wave, to obtain a second modulated wave. The first modulated wave and the second modulated wave may be three-phase modulated waves. The first modulated wave may include a first A-phase modulated wave, a first B-phase modulated wave, and a first C-phase modulated wave. The second modulated wave may include a second A-phase modulated wave, a second B-phase modulated wave, and a second C-phase modulated wave. The compensation unit 5133 may transmit the obtained three-phase second modulated wave to the power controller 512, so that the power controller 512 can determine a drive signal based on the second modulated wave and a carrier of the primary power conversion apparatus 510. The drive signal may be a three-phase drive signal, and the drive signal may include an A-phase drive signal, a B-phase drive signal, and a C-phase drive signal. Each phase drive signal may be used to control turn-on time of a plurality of switching transistors in two switch bridge arms in one dual-path PFC conversion circuit. For example, the A-phase drive signal may be used to control turn-on time of the switching transistors $S_{a1}$ and $S_{a2}$ in the dual-path PFC conversion circuit 1, the B-phase drive signal may be used to control turn-on time of the switching transistors $S_{b1}$ and $S_{b2}$ in the dual-path PFC conversion circuit 2, and the C-phase drive signal may be used to control turn-on time of the switching transistors $S_{c1}$ and $S_{c2}$ in the dual-path PFC conversion circuit 3, so that low-frequency circulating current components in the three dual-path PFC conversion circuits can reach the preset circulating current threshold.

In addition, a synchronization timer (not shown in the figure) in the primary circulating current controller 513 may further send a synchronization signal to the secondary circulating current controller 523 through a CAN bus, to synchronize the primary power conversion apparatus 510 with the secondary power conversion apparatus 510.

Circulating Current Detection Circuit 514

The circulating current detection circuit 514 may be connected to the input end of the AC-DC conversion circuit 511, to detect, in real time, a circulating current value input to the AC-DC conversion circuit 511. In some embodiments, an input end of the circulating current detection circuit 514 may be a single-phase input or a multi-phase input. The circulating current detection circuit 514 may be a three-phase input.

The secondary power conversion apparatus 520 may include an AC-DC conversion circuit 521, a power controller 522, a secondary circulating current controller 523, and a circulating current detection circuit 524.

It may be understood that a topology structure of the secondary power conversion apparatus 520 is the same as a topology structure of the primary power conversion apparatus 510. For descriptions of examples of the AC-DC conversion circuit 521, the power controller 522, the secondary circulating current controller 523, and the circulating current detection circuit 524, refer to the related descriptions of the foregoing primary power conversion apparatus 510. Details are not described herein again.

Figure 9:
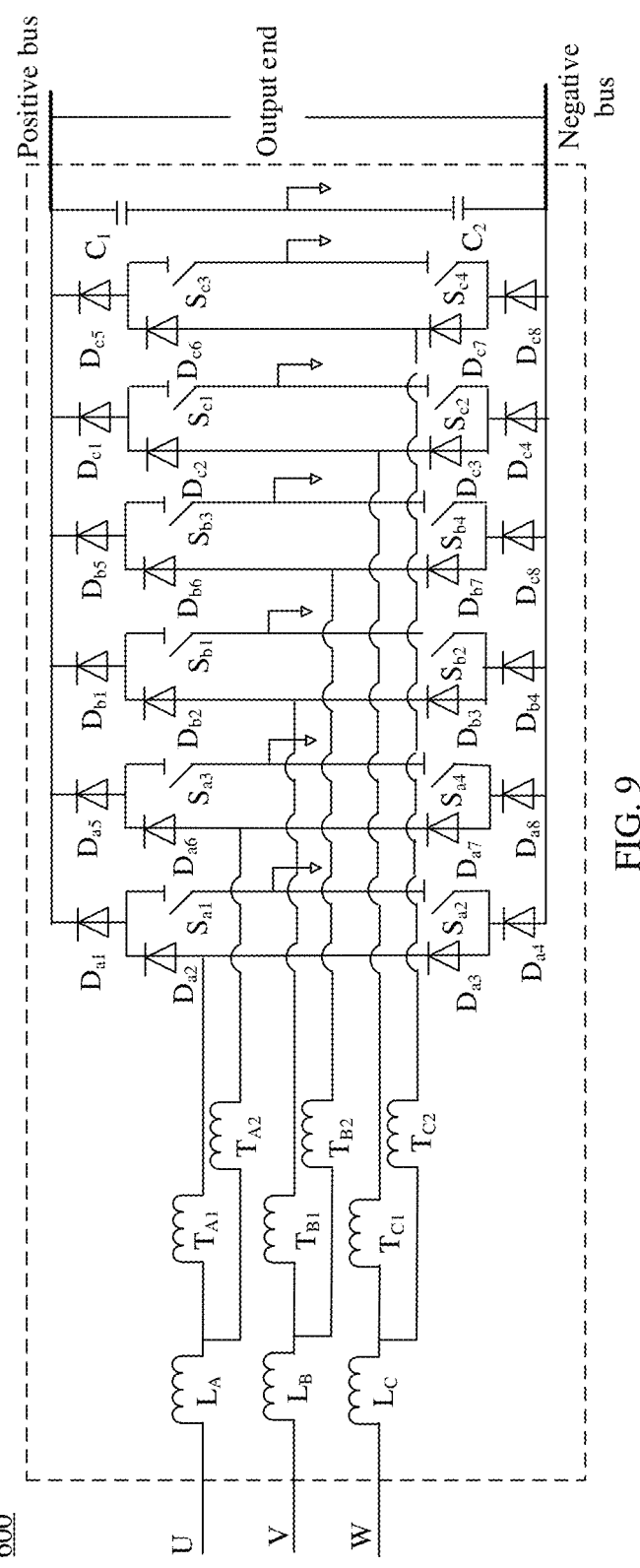
FIG. 9 is an example of an AC-DC conversion circuit according to an embodiment.

FIG. 9 is an example of an AC-DC conversion circuit 600 according to an embodiment. It should be understood that the AC-DC conversion circuit 600 may be the AC-DC conversion circuit 511 and the AC-DC conversion circuit 512.

Similar to the embodiment shown in FIG. 8, in the embodiment shown in FIG. 9, the AC-DC conversion circuit 600 may also include an input end, a three-phase dual-path PFC conversion circuit (such as a dual-path PFC conversion circuit 1, a dual-path PFC conversion circuit 2, and a dual-path PFC conversion circuit 3), and a capacitor circuit.

Different from the embodiment shown in FIG. 8, in the embodiment shown in FIG. 9, the AC-DC conversion circuit 600 may be a three-phase I-type interleaved Vienna rectifier circuit. In the AC-DC conversion circuit 600, each dual-path PFC conversion circuit may include an inductor, two windings of an autotransformer, and two switch bridge arms.

As shown in FIG. 9, the dual-path PFC conversion circuit 1 is used as an example. The PFC conversion circuit 1 may include an inductor $L_A$, two windings $T_{A1}$ and $T_{A2}$ of an autotransformer, a switch bridge arm 1, and a switch bridge arm 2. The switch bridge arm 1 includes switching transistors $S_{a1}$ and $S_{a2}$, and diodes $D_{a1}$, $D_{a2}$, $D_{a3}$, and $D_{a4}$. The switch bridge arm 2 includes switching transistors $S_{a3}$ and $S_{a4}$, and diodes $D_{a5}$, $D_{a6}$, $D_{a7}$, and Das. A left end of the inductor $L_A$ is connected to a first phase wire U, and a right end of the inductor $L_A$ is connected to left ends of the windings $T_{A1}$ and $T_{A2}$ of the autotransformer. A right end of the winding $T_{A1}$ of the autotransformer may be connected to the switch bridge arm 1, and a right end of the winding $T_{A2}$ of the autotransformer may be connected to the switch bridge arm 2. The switch bridge arm 1 and the switch bridge arm 2 may be connected in parallel between an upper end and a lower end of the capacitor circuit.

Correspondingly, the dual-path PFC conversion circuit 2 may include an inductor $L_B$, two windings $T_{B1}$ and $T_{B2}$ of an autotransformer, switching transistors $S_{b1}$, $S_{b2}$, $S_{b3}$, and $S_{b4}$, and diodes $D_{b1}$, $D_{b2}$, $D_{b3}$, $D_{b4}$, $D_{b5}$, $D_{b6}$, $D_{b7}$, and $D_{b8}$. A connection of the foregoing circuit components is similar to a connection structure of the dual-path PFC conversion circuit 1. For details, refer to the related descriptions of the dual-path PFC conversion circuit 1. Details are not described herein again.

Correspondingly, the PFC conversion circuit 3 may include an inductor $L_C$, two windings $T_{c1}$ and $T_{c2}$ of an autotransformer, switching transistors $S_{c1}$, $S_{c2}$, $S_{c3}$, and $S_{c4}$, and diodes $D_{c1}$, $D_{c2}$, $D_{c3}$, $D_{c4}$, $D_{c5}$, $D_{c6}$, $D_{c7}$ and $D_{c8}$. A connection of the foregoing circuit components is similar to a connection structure of the dual-path PFC conversion circuit 1. For details, refer to the related descriptions of the dual-path PFC conversion circuit 1. Details are not described herein again.

Optionally, in the AC-DC conversion circuit 600, at least some of the diodes may be replaced with controllable switching transistors.

Figure 10:
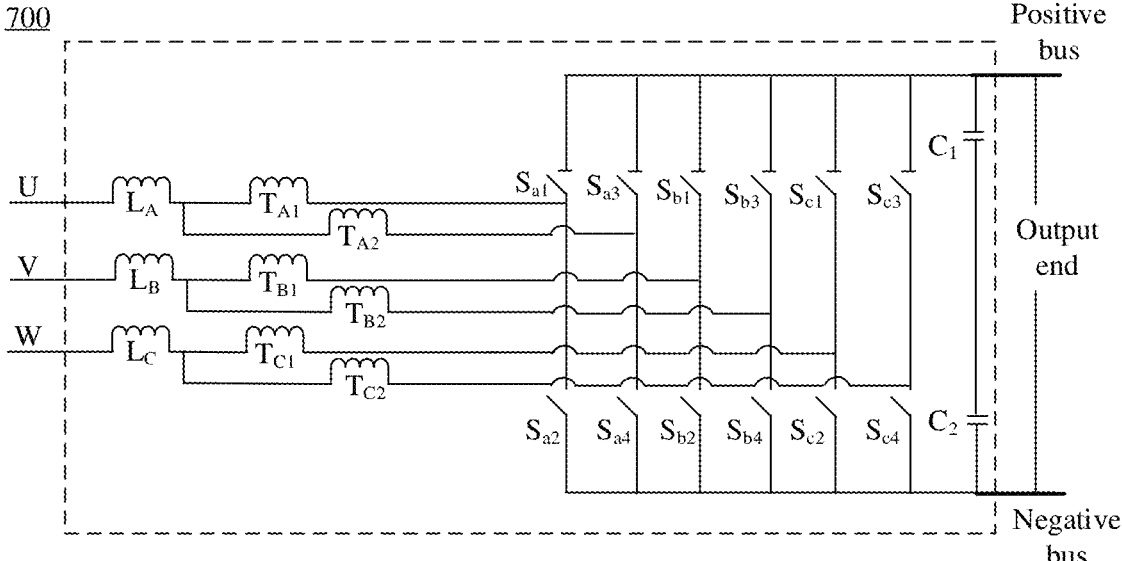
FIG. 10 is an example of an AC-DC conversion circuit according to an embodiment.

FIG. 10 is an example of an AC-DC conversion circuit 700 according to an embodiment. It should be understood that the AC-DC conversion circuit 700 may be the AC-DC conversion circuit 511 and the AC-DC conversion circuit 512.

Similar to embodiments shown in FIG. 8 and FIG. 9, in the embodiment shown in FIG. 10, the AC-DC conversion circuit 700 may also include an input end, a three-phase dual-path PFC conversion circuit (such as a dual-path PFC conversion circuit 1, a dual-path PFC conversion circuit 2, and a dual-path PFC conversion circuit 3), and a capacitor circuit.

Different from embodiments shown in FIG. 8 and FIG. 9, in the embodiment shown in FIG. 10, the AC-DC conversion circuit 700 may be a three-phase full-bridge rectifier circuit. In the AC-DC conversion circuit 700, each dual-path PFC conversion circuit may include an inductor, two windings of an autotransformer, and two switch bridge arms. The capacitor circuit may include a capacitor C1 and a capacitor $C_2$ that are connected in series.

As shown in FIG. 10, the dual-path PFC conversion circuit 1 is used as an example. The PFC conversion circuit 1 may include an inductor $L_A$, two windings $T_{A1}$ and $T_{A2}$ of an autotransformer, a switch bridge arm 1, and a switch bridge arm 2. The switch bridge arm 1 includes a switching transistor $S_{a1}$ and a switching transistor $S_{a2}$ that are connected in series. The switch bridge arm 2 includes a switching transistor $S_{a3}$ and a switching transistor $S_{a4}$ that are connected in series. A left end of the inductor $L_A$ is connected to a first phase wire U, and a right end of the inductor $L_A$ is connected to left ends of the windings $T_{A1}$ and $T_{A2}$ of the autotransformer. A right end of the winding $T_{A1}$ of the autotransformer may be connected to the switch bridge arm 1, and a right end of the winding $T_{A2}$ of the autotransformer may be connected to the switch bridge arm 2. The switch bridge arm 1 and the switch bridge arm 2 may be connected in parallel between an upper end and a lower end of the capacitor circuit.

Correspondingly, the dual-path PFC conversion circuit 2 may include an inductor $L_B$, two windings $T_{B1}$ and $T_{B2}$ of an autotransformer, and switching transistors $S_{b1}$, $S_{b2}$, $S_{b3}$, and $S_{b4}$. A connection of the foregoing circuit components is similar to a connection structure of the dual-path PFC conversion circuit 1. For details, refer to the related descriptions of the dual-path PFC conversion circuit 1. Details are not described herein again.

Correspondingly, the PFC conversion circuit 3 may include an inductor $L_C$, two windings $T_{c1}$ and $T_{c2}$ of an autotransformer, and switching transistors $S_{c1}$, $S_{c2}$, $S_{c3}$, and $S_{c4}$. A connection of the foregoing circuit components is similar to a connection structure of the dual-path PFC conversion circuit 1. For details, refer to the related descriptions of the dual-path PFC conversion circuit 1. Details are not described herein again.

It may be understood that, based on actual production and design requirements, compared with the three-phase T-type Vienna rectifier circuit and the three-phase I-type Vienna rectifier circuit, the three-phase full-bridge rectifier circuit used by the AC-DC conversion circuit 700 has a simpler power topology structure, so that the AC-DC conversion circuit 700 is better applicable to a scenario in which a switching transistor in a rectifier circuit is a high-voltage switching transistor, for example, a SiC transistor.

It may be understood that the foregoing implementation of the AC-DC conversion circuit is merely an example. The AC-DC conversion circuit may use another circuit structure based on actual production and design requirements.

Figure 11:
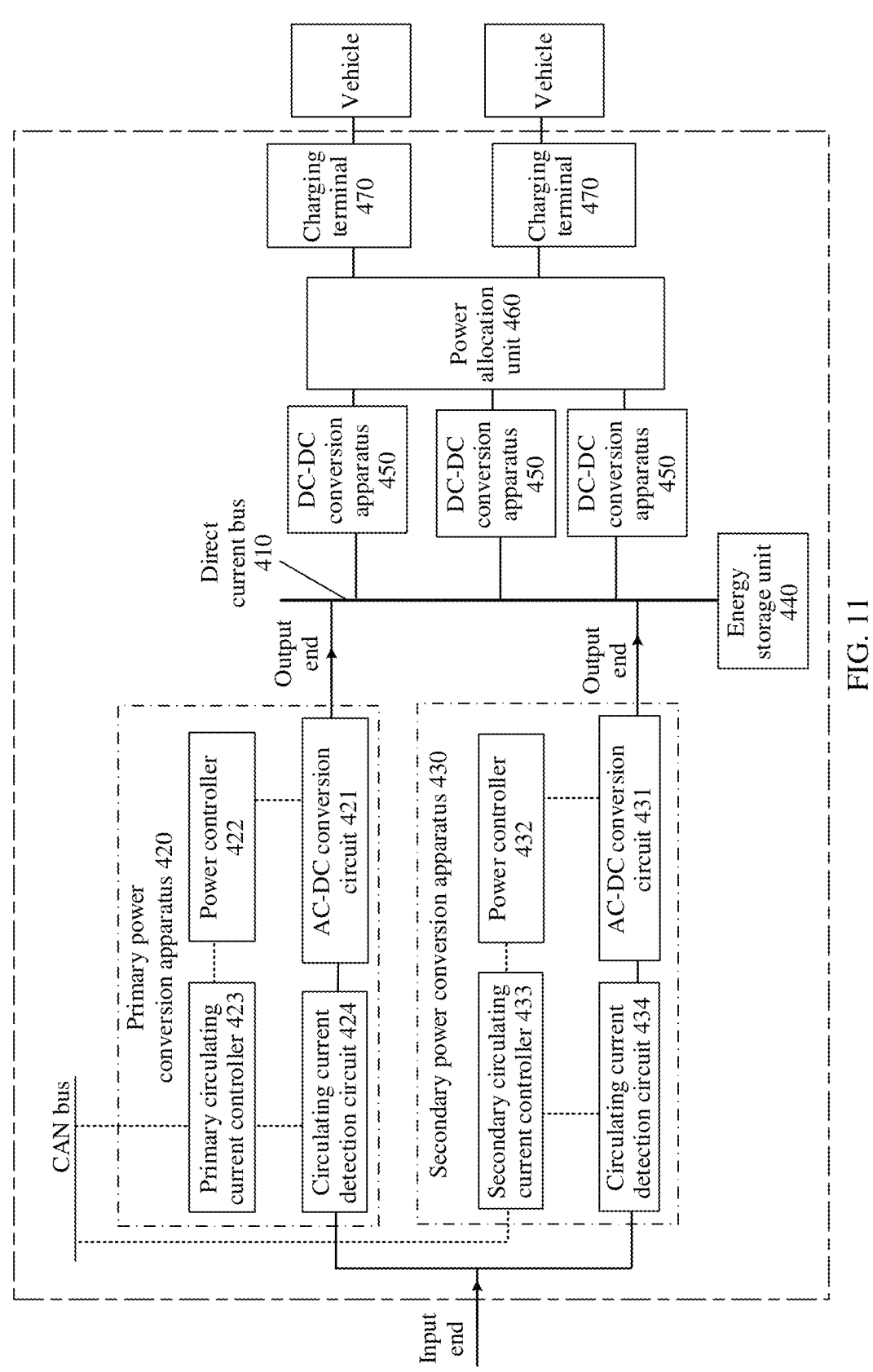
FIG. 11 is a diagram of a structure of another charging apparatus according to an embodiment.

FIG. 11 is a diagram of a structure of another charging apparatus 400 according to an embodiment. It should be understood that in FIG. 11, a solid connection line represents a power transmission line, and a dashed connection line represents a signal transmission line.

It should be further understood that the charging apparatus 400 shown in FIG. 11 includes features of the charging apparatus 400 shown in FIG. 4 and FIG. 7. The following may describe differences between FIG. 11 and FIG. 4 and FIG. 7. Most same content thereof is not described again.

In some embodiments, the charging apparatus 400 may further include a DC-DC conversion apparatus 450. An input end of the DC-DC conversion apparatus 450 may be connected to a direct current bus 410, and an output end of the DC-DC conversion apparatus 450 may be configured to be connected to a vehicle. The DC-DC conversion apparatus 450 may be configured to receive, through the direct current bus 410, first direct currents output by a primary power conversion apparatus 420 and a secondary power conversion apparatus 430, convert the first direct currents into second direct currents, and output the second direct currents to the vehicle, to supply power to the vehicle.

The primary power conversion apparatus 420 may include an AC-DC conversion circuit 421, and the secondary power conversion apparatus 430 may include an AC-DC conversion circuit 43. The AC-DC conversion circuit 421 and the AC-DC conversion circuit 431 are connected in parallel between an external power grid and the direct current bus 410 and are respectively configured to convert the received alternating currents into the first direct currents and output the first direct currents through the direct current bus 410. The DC-DC conversion apparatus 450 may receive the first direct currents through the direct current bus 410, convert the first direct currents into the second direct currents, and output the second direct currents to the vehicle.

In a possible example, the DC-DC conversion apparatus 450 may directly receive, through the direct current bus 410, the first direct currents output by the AC-DC conversion circuit 421 and the AC-DC conversion circuit 431.

In another possible example, the charging apparatus 400 may further include an energy storage unit 440. The energy storage unit 440 may be connected to the direct current bus 410. The first direct currents output by the AC-DC conversion circuit 421 and the AC-DC conversion circuit 431 may be transmitted to the energy storage unit 440 through the direct current bus 410. The DC-DC conversion apparatus 450 may receive the first direct currents from the energy storage unit 440 through the direct current bus 410.

It may be understood that there may be one or more DC-DC conversion apparatuses 450 in the charging apparatus 400. In addition, a quantity of DC-DC conversion apparatuses 450 may be the same as or different from a quantity of power conversion apparatuses in the charging apparatus 400 (such as a sum of quantities of primary power conversion apparatuses 420 and at least one secondary power conversion apparatus 430).

When there are a plurality of DC-DC conversion apparatuses 450, the charging apparatus 400 may further include a power allocation unit 460. The power allocation unit 460 may be connected between output ends of the plurality of DC-DC conversion apparatuses 450 and the vehicle. The power allocation unit 460 may be configured to dynamically allocate, based on charging power actually required by the vehicle, the second direct currents output by the plurality of DC-DC conversion apparatuses 450.

For example, the power allocation unit 460 may use the second direct currents output by the plurality of DC-DC conversion apparatuses 450, to charge one vehicle, or the power allocation unit 460 may use the second direct currents output by the plurality of DC-DC conversion apparatuses 450, to charge a plurality of vehicles.

The charging apparatus 400 may further include at least one charging terminal 470. The at least one charging terminal 470 is connected to the output end of the DC-DC conversion apparatus 450. Each of the at least one charging terminal 470 is configured to connect to a vehicle, so that the DC-DC conversion apparatus 450 charges, by using each charging terminal 470, the vehicle connected to the charging terminal 470.

It may be understood that during implementation, each charging terminal 470 may be connected to at least one DC-DC conversion apparatus 450 in the charging apparatus 400.

For a non-detailed part of the charging terminal 470, refer to embodiments shown in FIG. 1 and FIG. 2. Details are not described herein again.

An embodiment further provides a charging system. The charging system may include the foregoing charging apparatus 400 and a vehicle. The charging apparatus 400 may charge the vehicle. For descriptions, refer to embodiments shown in FIG. 1 and FIG. 2. Details are not described herein again.

The foregoing descriptions are merely implementations, but are not intended to limit the scope of the embodiments. Any variation or replacement readily figured out by a person skilled in the art shall fall within the scope of embodiments.

What is claimed is:

1. A power conversion apparatus, comprising: an alternating current-direct current (AC-DC) conversion circuit; a power controller connected to the AC-DC conversion circuit, and the power controller is configured to: control the AC-DC conversion circuit to receive an alternating current, convert the alternating current into a first direct current, and output the first direct current; a circulating current controller configured to send a synchronization signal to another power conversion apparatus through a controller area network (CAN) bus and the synchronization signal is used to synchronize a carrier of the another power conversion apparatus with a carrier of the power conversion apparatus; and a circulating current detection circuit, and the AC-DC conversion circuit comprises a plurality of switches, the circulating current detection circuit is connected to an input end of the AC-DC conversion circuit and the circulating current controller, and the circulating current detection circuit is configured to: detect a circulating current value at the input end of the AC-DC conversion circuit, and transmit the circulating current value to the circulating current controller, and the circulating current controller is further configured to: receive a first modulated wave from the power controller, and adjust the first modulated wave based on the circulating current value, to obtain a second modulated wave, wherein the second modulated wave is used to determine a drive signal and the drive signal is used to control turn-on time of the plurality of switches.

2. The power conversion apparatus according to claim 1, wherein the circulating current controller comprises:

a first primary timer configured to adjust, based on edge triggering of the synchronization signal, a period of the carrier of the power conversion apparatus to be synchronized with a target carrier period, and the target carrier period is synchronized with a period of the carrier of the another power conversion apparatus.

3. The power conversion apparatus according to claim 2, wherein the circulating current controller further comprises:

a first secondary timer connected to the first primary timer, and the first primary timer is further configured to:

when a count value of the first primary timer is a period value of the target carrier period, send a first trigger signal to the first secondary timer, wherein the first trigger signal indicates to reset a count value of the first secondary timer, so that the first primary timer is synchronized with the first secondary timer.

4. The power conversion apparatus according to claim 2, wherein the circulating current controller further comprises:

a synchronization timer connected to the first primary timer and the another power conversion apparatus, and the synchronization timer is configured to:

when a count value of the synchronization timer is a first period value, send the synchronization signal to the first primary timer and the another power conversion apparatus.

5. The power conversion apparatus according to claim 1, wherein the circulating current controller is further configured to: determine a circulating current deviation based on the circulating current value and a preset circulating current threshold; perform operation adjustment on the circulating current deviation, to obtain a first compensation amount; and perform superposition processing on the first compensation amount and the first modulated wave, to obtain the second modulated wave.

6. The power conversion apparatus according to claim 1, wherein the circulating current controller is further configured to: send the second modulated wave to the power controller; and the power controller is further configured to: determine the drive signal based on the second modulated wave and the carrier of the power conversion apparatus.

7. A power conversion apparatus, comprising: an alternating current-direct current (AC-DC) conversion circuit; a power controller connected to the AC-DC conversion circuit, and the power controller is configured to control the AC-DC conversion circuit to receive an alternating current, convert the alternating current into a first direct current, and output the first direct current; and a circulating current controller configured to receive a synchronization signal from another power conversion apparatus through a controller area network (CAN) bus and the synchronization signal is used to synchronize a carrier of the power conversion apparatus with a carrier of the another power conversion apparatus; and a circulating current detection circuit, the AC-DC conversion circuit comprises a plurality of switches, the circulating current detection circuit is connected to an input end of the AC-DC conversion circuit and the circulating current controller, and the circulating current detection circuit is configured to: detect a circulating current value at the input end of the AC-DC conversion circuit, and transmit the circulating current value to the circulating current controller; and the circulating current controller is further configured to: receive a first modulated wave from the power controller and adjust the first modulated wave based on the circulating current value, to obtain a second modulated wave, the second modulated wave is used to determine a drive signal, and the drive signal is used to control turn-on time of the plurality of switches.

8. The power conversion apparatus according to claim 7, wherein the circulating current controller comprises:

a second primary timer configured to adjust, based on edge triggering of the synchronization signal, a period of the carrier of the power conversion apparatus to be synchronized with a target carrier period, and the target carrier period is synchronized with a period of the carrier of the another power conversion apparatus.

9. The power conversion apparatus according to claim 8, wherein the circulating current controller further comprises:

a second secondary timer connected to the second primary timer, and the second primary timer is further configured to:

when a count value of the second primary timer is a period value of the target carrier period, send a second trigger signal to the second secondary timer, and the second trigger signal indicates to reset a count value of the second secondary timer, so that the second primary timer is synchronized with the second secondary timer.

10. The power conversion apparatus according to claim 7, wherein the circulating current controller is further configured to: determine a circulating current deviation based on the circulating current value and a preset circulating current threshold; perform operation adjustment on the circulating current deviation, to obtain a first compensation amount; and perform superposition processing on the first compensation amount and the first modulated wave, to obtain the second modulated wave.

11. The power conversion apparatus according to claim 7, wherein the circulating current controller is further configured to: send the second modulated wave to the power controller; and the power controller is further configured to:

determine the drive signal based on the second modulated wave and the carrier of the power conversion apparatus.

12. A charging apparatus, comprising a plurality of power conversion apparatuses and a direct current bus, wherein the plurality of power conversion apparatuses are disposed in parallel, and each of the plurality of power conversion apparatuses comprises: an alternating current-direct current (AC-DC) conversion circuit; a power controller connected to the AC-DC conversion circuit, and the power controller is configured to: control the AC-DC conversion circuit to receive an alternating current, convert the alternating current into a first direct current, and output the first direct current through the direct current bus; and a circulating current controller; the plurality of power conversion apparatuses comprise a primary power conversion apparatus and at least one secondary power conversion apparatus, a circulating current controller of the primary power conversion apparatus is a primary circulating current controller, and a circulating current controller of the secondary power conversion apparatus is a secondary circulating current controller; and the primary circulating current controller is configured to: send a synchronization signal to the secondary circulating current controller through a controller area network (CAN) bus, and the synchronization signal is used to synchronize a carrier of the secondary power conversion apparatus with a carrier of the primary power conversion apparatus; and a circulating current detection circuit, the AC-DC conversion circuit comprises a plurality of switches, the circulating current detection circuit is connected to an input end of the AC-DC conversion circuit and the circulating current controller, and the circulating current detection circuit is configured to: detect a circulating current value at the input end of the AC-DC conversion circuit and transmit the circulating current value to the circulating current controller; and the circulating current controller is configured to: receive a first modulated wave from the power controller and adjust the first modulated wave based on the circulating current value, to obtain a second modulated wave, and the second modulated wave is used to determine a drive signal, and the drive signal is used to control turn-on time of the plurality of switches.

13. The charging apparatus according to claim 12, wherein the primary circulating current controller comprises a first primary timer, and the secondary circulating current controller comprises a second primary timer;

the first primary timer is configured to adjust, based on edge triggering of the synchronization signal, a period of the carrier of the primary power conversion apparatus to be synchronized with a target carrier period; and the second primary timer is configured to adjust, based on edge triggering of the synchronization signal, a period of the carrier of the secondary power conversion apparatus to be synchronized with the target carrier period.

14. The charging apparatus according to claim 13, wherein the primary circulating current controller further comprises a first secondary timer, and the secondary circulating current controller further comprises a second secondary timer;

the first secondary timer is connected to the first primary timer, and the second secondary timer is connected to the second primary timer;

the first primary timer is further configured to:

when a count value of the first primary timer is a period value of the target carrier period, send a first trigger signal to the first secondary timer, and the first trigger signal indicates to reset a count value of the first secondary timer, so that the first primary timer is synchronized with the first secondary timer; and the second primary timer is further configured to:

when a count value of the second primary timer is the period value of the target carrier period, send a second trigger signal to the second secondary timer, and the second trigger signal indicates to reset a count value of the second secondary timer, so that the second primary timer is synchronized with the second secondary timer.

15. The charging apparatus according to claim 13, wherein the primary circulating current controller further comprises a synchronization timer, and the synchronization timer is connected to the first primary timer and the second primary timer; and the synchronization timer is configured to:

when a count value of the synchronization timer is a first period value, send the synchronization signal to the first primary timer and the second primary timer.

16. The charging apparatus according to claim 12, wherein the circulating current controller is further configured to: determine a circulating current deviation based on the circulating current value and a preset circulating current threshold; perform operation adjustment on the circulating current deviation, to obtain a first compensation amount; and perform superposition processing on the first compensation amount and the first modulated wave, to obtain the second modulated wave.

17. The charging apparatus according to claim 12, wherein the circulating current controller is further configured to: send the second modulated wave to the power controller; and the power controller is further configured to: determine the drive signal based on the second modulated wave and the carrier of the power conversion apparatus.

* * * * *